(12) United States Patent
Moock et al.

(10) Patent No.: US 12,460,451 B2
(45) Date of Patent: *Nov. 4, 2025

(54) ANTI-THEFT DEVICE FOR PORTABLE ELECTRONIC DEVICE

(71) Applicant: InVue Security Products Inc., Charlotte, NC (US)

(72) Inventors: Andrew W. Moock, Brecksville, OH (US); Jeffrey A. Grant, Charlotte, NC (US); Christopher J. Fawcett, Charlotte, NC (US); Nicholas M. Sedon, Weddington, NC (US); Matthew Thomas Kerley, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/079,986

(22) Filed: Mar. 14, 2025

(65) Prior Publication Data

US 2025/0207436 A1 Jun. 26, 2025

Related U.S. Application Data

(63) Continuation of application No. 18/230,427, filed on Aug. 4, 2023, now Pat. No. 12,264,510, which is a (Continued)

(51) Int. Cl.
*E05B 73/00* (2006.01)
*G06F 1/16* (2006.01)
*G08B 13/06* (2006.01)

(52) U.S. Cl.
CPC .......... *E05B 73/0082* (2013.01); *E05B 73/00* (2013.01); *G06F 1/1632* (2013.01); *G08B 13/06* (2013.01)

(58) Field of Classification Search
CPC ........ G07G 1/00; G07G 1/0081; G08B 13/00; G08B 13/06; G08B 13/14; G08B 13/1403;
(Continued)

(56) References Cited

U.S. PATENT DOCUMENTS

| | | |
|---|---|---|
| 5,757,616 A | 5/1998 | May et al. |
| 5,878,211 A | 3/1999 | Delagrange et al. |

(Continued)

FOREIGN PATENT DOCUMENTS

| | | |
|---|---|---|
| CN | 102037201 A | 4/2011 |
| WO | 2012/137007 A1 | 1/2012 |

(Continued)

OTHER PUBLICATIONS

Remotely actuated dispplay system and related methods by Hoefgen et al, filed and publiced on Jun. 5, 2013.*

(Continued)

*Primary Examiner* — Van T Trieu
(74) *Attorney, Agent, or Firm* — InVue Security Products Inc.

(57) ABSTRACT

An anti-theft device for protecting a portable electronic device from theft or unauthorized removal in a retail environment is provided. A shroud may at least partially enclose a portable electronic device. A dock may releasably engage the shroud such that the shroud and portable electronic device are locked to the dock when engaged with the dock. A key may engage activate a lock mechanism to release the shroud and the portable electronic device from the dock.

34 Claims, 15 Drawing Sheets

Related U.S. Application Data continuation of application No. 17/712,702, filed on Apr. 4, 2022, now Pat. No. 11,753,852, which is a continuation of application No. 16/932,055, filed on Jul. 17, 2020, now Pat. No. 11,293,202, which is a continuation of application No. 16/278,295, filed on Feb. 18, 2019, now Pat. No. 10,738,508, which is a continuation of application No. 15/977,401, filed on May 11, 2018, now Pat. No. 10,227,796, which is a continuation of application No. 15/392,598, filed on Dec. 28, 2016, now Pat. No. 9,970,217, which is a continuation of application No. 14/300,476, filed on Jun. 10, 2014, now Pat. No. 9,567,776.

(60) Provisional application No. 61/899,398, filed on Nov. 4, 2013, provisional application No. 61/889,212, filed on Oct. 10, 2013, provisional application No. 61/846,806, filed on Jul. 16, 2013, provisional application No. 61/833,655, filed on Jun. 11, 2013.

(58) Field of Classification Search
CPC ............ G08B 13/1613; G08B 13/1632; G08B 13/1679; G06Q 30/00; G06Q 30/0601; G06Q 30/0641; E05B 47/0012; E05B 73/00; E05B 73/0082; F16M 11/041; F16M 13/00; F16M 2200/02; Y01T 29/49826; E05N 73/0082
See application file for complete search history.

(56) References Cited

U.S. PATENT DOCUMENTS

| | | |
|---|---|---|
| 5,947,359 A | 9/1999 | Yoshie |
| 5,966,285 A | 10/1999 | Sellers |
| 6,380,855 B1 | 4/2002 | Ott |
| 6,581,420 B1 | 6/2003 | Ling et al. |
| 6,595,792 B1 | 7/2003 | Rudolph et al. |
| 6,763,690 B2 | 7/2004 | Galant |
| 6,913,232 B2 | 7/2005 | Richter |
| 7,035,095 B2 | 4/2006 | Frame et al. |
| 7,218,226 B2 | 5/2007 | Wehrenberg |
| 7,299,668 B1 | 11/2007 | Lu |
| 7,327,276 B1 | 2/2008 | Deconinck et al. |
| 7,522,047 B2 | 4/2009 | Belden, Jr. et al. |
| 7,592,548 B2 | 9/2009 | Marszalek et al. |
| 7,598,842 B2 | 10/2009 | Landram et al. |
| 7,614,601 B2 | 11/2009 | Marsilio et al. |
| 7,661,648 B2 | 2/2010 | Lin |
| 7,701,339 B2 | 4/2010 | Irmscher et al. |
| 7,753,330 B2 | 7/2010 | Brief |
| 7,971,845 B2 | 7/2011 | Galant |
| 7,993,414 B2 | 8/2011 | Jeansonne et al. |
| 8,066,241 B2 | 11/2011 | Yu et al. |
| 8,106,772 B2 | 1/2012 | Irmscher et al. |
| 8,191,851 B2 | 6/2012 | Crown |
| 8,212,672 B2 | 7/2012 | Brenner |
| 8,250,278 B2 | 8/2012 | Tseng et al. |
| 8,418,514 B1 | 4/2013 | Su |
| 8,451,115 B2 | 5/2013 | Imukai et al. |
| 8,451,128 B2 | 5/2013 | Yang |
| 8,452,868 B2 | 5/2013 | Shafer et al. |
| RE44,433 E | 8/2013 | Fong et al. |
| 8,508,363 B2 | 8/2013 | Raniere |
| 8,558,688 B2 | 10/2013 | Henson et al. |
| 8,564,438 B2 | 10/2013 | Fawcett et al. |
| 8,581,713 B1 | 11/2013 | Morgan et al. |
| 8,711,553 B2 | 4/2014 | Trinh et al. |
| 8,749,387 B2 | 6/2014 | Fawcett et al. |
| 8,813,528 B2 | 8/2014 | Olear et al. |
| 8,814,128 B2 | 8/2014 | Trinh et al. |
| 8,833,116 B1 | 9/2014 | Brown |
| 8,869,573 B2 | 10/2014 | Myers et al. |
| 8,872,660 B2 | 10/2014 | Yunker et al. |
| 8,910,914 B2 | 12/2014 | Bigeh |
| 8,979,040 B2 | 3/2015 | Chien et al. |
| 9,032,766 B2 | 5/2015 | Su |
| 9,097,380 B2 | 8/2015 | Wheeler |
| 9,159,309 B2 | 10/2015 | Liu et al. |
| 9,161,466 B2 | 10/2015 | Huang |
| 9,163,433 B2 | 10/2015 | Sedon |
| 9,252,605 B1 | 2/2016 | Custon et al. |
| 9,567,776 B2 | 2/2017 | Moock et al. |
| 9,714,528 B2 | 7/2017 | Van Balen |
| 9,970,217 B2 | 5/2018 | Moock et al. |
| 10,176,345 B2 | 1/2019 | Sedon |
| 10,227,796 B2 | 3/2019 | Moock et al. |
| 11,293,202 B2 | 4/2022 | Moock et al. |
| 11,753,852 B2 | 9/2023 | Moock et al. |
| 12,264,510 B2 * | 4/2025 | Moock ............... E05B 47/0012 |
| 2004/0120112 A1* | 6/2004 | Mullen ............... E05B 73/0082 248/552 |
| 2004/0177658 A1 | 9/2004 | Mtchell |
| 2006/0066438 A1 | 3/2006 | Altounian et al. |
| 2006/0215836 A1 | 9/2006 | Wang |
| 2006/0233601 A1 | 10/2006 | Crain et al. |
| 2007/0145211 A1 | 6/2007 | Marsilio et al. |
| 2007/0215766 A1 | 9/2007 | Yen |
| 2008/0042020 A1 | 2/2008 | Laitila et al. |
| 2008/0169923 A1 | 7/2008 | Belden et al. |
| 2008/0196457 A1 | 8/2008 | Goldman |
| 2008/0209965 A1 | 9/2008 | Maack |
| 2008/0266089 A1 | 10/2008 | Haren et al. |
| 2008/0276672 A1 | 11/2008 | Gartner |
| 2009/0058643 A1 | 3/2009 | Groth |
| 2009/0158423 A1 | 6/2009 | Orlassino et al. |
| 2009/0166483 A1 | 7/2009 | Marsilio et al. |
| 2009/0189033 A1 | 7/2009 | Lin |
| 2010/0008028 A1 | 1/2010 | Richardson |
| 2010/0060410 A1 | 3/2010 | Wirth |
| 2010/0079285 A1 | 4/2010 | Fawcett et al. |
| 2010/0108828 A1 | 5/2010 | Yu et al. |
| 2010/0124005 A1 | 5/2010 | Hotary et al. |
| 2010/0147041 A1 | 6/2010 | Teicher et al. |
| 2010/0214469 A1 | 8/2010 | Duncan |
| 2010/0301998 A1 | 12/2010 | Marszalek et al. |
| 2011/0068906 A1 | 3/2011 | Shafer et al. |
| 2011/0068921 A1 | 3/2011 | Shafer |
| 2011/0080137 A1 | 4/2011 | Avganim |
| 2011/0100073 A1 | 5/2011 | Johnston et al. |
| 2011/0102179 A1 | 5/2011 | Ezzo et al. |
| 2011/0174937 A1 | 7/2011 | Sullivan |
| 2011/0187531 A1 | 8/2011 | Oehl et al. |
| 2011/0303709 A1 | 12/2011 | Wizikowski |
| 2012/0019383 A1 | 1/2012 | Fawcett et al. |
| 2012/0020046 A1 | 1/2012 | Takashima |
| 2012/0026684 A1 | 2/2012 | Matthews |
| 2012/0033375 A1 | 2/2012 | Madonna et al. |
| 2012/0080577 A1 | 4/2012 | Mcintyre et al. |
| 2012/0118770 A1 | 5/2012 | Valls et al. |
| 2012/0126083 A1 | 5/2012 | Nemoto |
| 2012/0175474 A1 | 7/2012 | Barnard et al. |
| 2012/0182146 A1 | 7/2012 | Berglund et al. |
| 2012/0182680 A1 | 7/2012 | Wetzel et al. |
| 2012/0234055 A1 | 9/2012 | Bland, III et al. |
| 2012/0268103 A1 | 10/2012 | Henson et al. |
| 2012/0268275 A1 | 10/2012 | Brenner |
| 2012/0273630 A1 | 11/2012 | Gillespie-Brown et al. |
| 2012/0278907 A1 | 11/2012 | Wehrenberg |
| 2012/0293330 A1 | 11/2012 | Grant et al. |
| 2012/0297575 A1 | 11/2012 | Garcia |
| 2012/0312936 A1 | 12/2012 | Huang |
| 2013/0026322 A1 | 1/2013 | Wheeler et al. |
| 2013/0026324 A1 | 1/2013 | Fischer et al. |
| 2013/0058023 A1 | 3/2013 | Supran et al. |
| 2013/0067967 A1 | 3/2013 | Olear et al. |
| 2013/0078855 A1 | 3/2013 | Hornick et al. |
| 2013/0106592 A1 | 5/2013 | Morgan et al. |
| 2013/0107449 A1 | 5/2013 | Su et al. |
| 2013/0109253 A1 | 5/2013 | Gammon et al. |
| 2013/0120139 A1 | 5/2013 | Chen |
| 2013/0126688 A1 | 5/2013 | Li et al. |
| 2013/0134284 A1 | 5/2013 | Hu et al. |

(56) References Cited

U.S. PATENT DOCUMENTS

| | | |
|---|---|---|
| 2013/0135095 A1 | 5/2013 | Stochita |
| 2013/0135803 A1 | 5/2013 | Johnson et al. |
| 2013/0169434 A1 | 7/2013 | McCown et al. |
| 2013/0228570 A1 | 9/2013 | Tseng |
| 2013/0255336 A1 | 10/2013 | Desai et al. |
| 2013/0318937 A1 | 12/2013 | Takeuchi et al. |
| 2014/0013810 A1 | 1/2014 | Brobst et al. |
| 2014/0053185 A1 | 2/2014 | Bleacher |
| 2014/0060218 A1 | 3/2014 | Bisesti et al. |
| 2014/0118930 A1 | 5/2014 | Sedon |
| 2014/0130554 A1 | 5/2014 | Su |
| 2014/0168884 A1 | 6/2014 | Wylie |
| 2014/0203156 A1 | 7/2014 | Stener |
| 2014/0249944 A1* | 9/2014 | Hicks .................. G07G 1/0081 235/383 |
| 2014/0266725 A1 | 9/2014 | Berglund et al. |
| 2014/0362517 A1 | 12/2014 | Moock et al. |
| 2014/0366164 A1* | 12/2014 | Hoefgen .................. G06F 21/88 726/34 |
| 2016/0201359 A1 | 7/2016 | Berglund et al. |
| 2016/0335859 A1 | 11/2016 | Sankey |
| 2016/0335860 A1 | 11/2016 | Richardson et al. |
| 2017/0107742 A1 | 4/2017 | Moock et al. |
| 2018/0258669 A1 | 9/2018 | Moock et al. |
| 2019/0122009 A1 | 4/2019 | Sedon |
| 2019/0178010 A1 | 6/2019 | Moock et al. |
| 2020/0250351 A1 | 8/2020 | Sedon |
| 2020/0347648 A1 | 11/2020 | Moock et al. |
| 2023/0407684 A1 | 12/2023 | Moock et al. |

FOREIGN PATENT DOCUMENTS

| | | |
|---|---|---|
| WO | 2013/023091 A2 | 2/2013 |
| WO | 2014/078966 A1 | 5/2014 |
| WO | 2015/026918 A1 | 2/2015 |

OTHER PUBLICATIONS

Vanguard Protex Global, Inc., "Volt the Power to Inspire Awe", Jun. 8, 2012, pp. 1-2.
Archelon, "Archelon Keep Your Tablets Safe", Dec. 3, 2011, pp. 1-2.
Ewan, "iPad Enclosures to Help Lock-Down iPads for Public Use", "Mobile Industry Review News and Opinion for Industry Executives and Mobile Fanatics", Feb. 6, 2011, pp. 1-6.
Armor Active, "Locking iPad 2 Kiosk Tradeshow Exhibit". May 2011, pp. 1-4.
David Everson, "Mobile Technologies Inc, and the Enterprise Tablet Pro", Mobile Technologies Inc., Aug. 15, 2013, pp. 1-2.
"J-Plug", Multplx, 2012, 11 pages, London, England.
"J-Plug Splitter Alarm & Charging", Multplx, 2012, 2 pages, London, England.
Shane Thomas, Notification of Transmittal of the International Search Report and the Written Opinion of the International Searching Authority, or the Declaration for International Patent Application No. PCT/US2014/041664, Mar. 18, 2015, pp. 1-9, United States Searching Authority, Alexandria, Virginia USA.
Armoractive, [iPad] enclosures; see website at www.ipadenclosures.com; printed Oct. 9, 2013; 5 pages; Salt Lake City, Utah, USA.
Us+U Exclusive Swivel Cases for iPad 2nd/3rd Gen & Kindle Fire; see website at www.ipadincanada.ca; printed Jun. 11, 2013; 12 pages; Canada.
Tether Tools; TabStrap featuring BlackRapid; see website at www.shop.tethertools.com; printed Jun. 11, 2013; 2 pages; Phoenix, AZ, USA.
First Office Action from corresponding Chinese patent application No. 201480033180.1, dated Jul. 4, 2017 (8 pages).
Extended European Search Report from corresponding European Patent Application No. 14850527.4, dated Feb. 9, 2017 (7 pages).

* cited by examiner

ANTI-THEFT DEVICE FOR PORTABLE ELECTRONIC DEVICE

CROSS REFERENCE TO RELATED APPLICATIONS

This application is a continuation of and claims priority to U.S. application Ser. No. 18/230,427, filed on Aug. 4, 2023, now U.S. Pat. No. 12,264,510, which is a continuation of U.S. application Ser. No. 17/712,702, filed on Apr. 4, 2022, now U.S. Pat. No. 11,753,852, which is a continuation of U.S. application Ser. No. 16/932,055, filed on Jul. 17, 2020, now U.S. Pat. No. 11,293,202, which is a continuation of U.S. application Ser. No. 16/278,295, filed on Feb. 18, 2019, now U.S. Pat. No. 10,738,508, which is a continuation of U.S. application Ser. No. 15/977,401, filed May 11, 2018, now U.S. Pat. No. 10,227,796, which is a continuation of U.S. application Ser. No. 15/392,598, filed on Dec. 28, 2016, now U.S. Pat. No. 9,970,217, which is a continuation of U.S. application Ser. No. 14/300,476, filed on Jun. 10, 2014, now U.S. Pat. No. 9,567,776, which is a non-provisional application that claims the benefit of priority of U.S. Provisional Application No. 61/833,655 filed on Jun. 11, 2013, and U.S. Provisional Application No. 61/846,806 filed on Jul. 16, 2013, and U.S. Provisional Application No. 61/889,212 filed on Oct. 10, 2013, and U.S. Provisional Application No. 61/899,398 filed on Nov. 4, 2013, the entire disclosures of which are incorporated herein by reference.

FIELD OF THE INVENTION

Embodiments of the present invention relate generally to an anti-theft device for protecting a portable electronic device.

BACKGROUND OF THE INVENTION

A recent trend in work and retail store environments is to use smart devices, sometimes cellphones, but more often tablets, as customer service devices. This usage takes on two forms. One form is using a tablet as a kiosk where customers can interact with the device. This may be used to deliver information about the establishment or its products to the consumer, or to act as an interface for customer loyalty programs in lieu of plastic cards. A second usage is for retail store associates to carry such a device around the store to assist customers. The associate may use the device to display a layout of the store to show a customer where an item is, check on a price of an item, or access information regarding a product the customer is buying. In some stores, tablets are being used to check-out customers. Restaurants may use smart devices at a table for ordering or game playing. Hospitals may allow doctors and nurses to carry smart devices for mobile access to patient's health charts.

This trend requires customers, store associates and employees to interact with smart devices that tend to be fairly expensive. In some instances, the customer, store associate or employee may need to leave the smart device unattended for a period of time to perform another task. Thus, there is a need for an anti-theft device for protecting a portable electronic device from theft, while allowing a sufficient level of user interaction with the portable electronic device.

SUMMARY OF THE INVENTION

In one embodiment of the invention, an anti-theft device for protecting a portable electronic device from theft or unauthorized removal is provided. The anti-theft device includes a sensor operably coupled to the portable electronic device. The sensor is configured to generate a security signal when the sensor is removed from the portable electronic device. The sensor is further configured to generate a security signal based on a location of the portable electronic device relative to an authorized device, location, or perimeter. The sensor may be integrated with the portable electronic device, or alternatively, the sensor may be attached to the portable electronic device. The anti-theft device may further include a shroud configured to at least partially enclose the portable electronic device with the sensor operably engaged with the shroud. The anti-theft device may further include a key configured to be paired with the portable electronic device and/or the sensor. The key may be configured to communicate wirelessly with the portable electronic device and the sensor may be configured to generate a security signal when the portable electronic device is displaced a predetermined distance from the key.

In another embodiment, an anti-theft device for protecting a portable electronic device from theft or unauthorized removal is provided. The anti-theft device includes a shroud configured to at least partially enclose the portable electronic device and a sensor operably engaged with the shroud. The sensor is configured to generate a security signal when the sensor is removed from the shroud and/or the shroud is removed from the portable electronic device. The sensor is further configured to generate a security signal based on a location of the portable electronic device relative to an authorized device, location, or perimeter. The anti-theft device may further include a key configured to be paired with the portable electronic device and/or the sensor. The shroud may include a port configured to receive a wireless security signal from the key. The sensor may be integrated with the shroud.

In yet another embodiment, a method for protecting a portable electronic device from theft or unauthorized removal is provided. The method includes coupling a sensor to a portable electronic device and arming the sensor such that the sensor is configured to generate a security signal when the sensor is removed from the portable electronic device and to generate a security signal based on a location of the electronic device relative to an authorized device, location, or perimeter. The method may further include at least partially enclosing the portable electronic device with a shroud. The method may further include defining an authorized perimeter using the portable electronic device.

In another embodiment, a method for protecting a portable electronic device from theft or unauthorized removal is provided. The method includes detecting a location of a portable electronic device or a sensor coupled to the portable electronic device and generating a security signal based on the location of the portable electronic device relative to an authorized device, location, or perimeter. The method may further include generating a security signal when the sensor is removed from the portable electronic device. The method may further include detecting a change in the light level of the sensor and/or the portable electronic device for a predetermined period of time while the sensor and/or the portable electronic device is moving. The method may further include detecting displacement of the portable electronic device or the sensor relative to a key paired with the portable electronic device or the sensor. The method may further include generating a security signal when the portable electronic device is displaced a predetermined distance relative to an authorized device, location, or perimeter. The method may further include generating a security signal when the portable electronic device or the sensor is located outside of an authorized perimeter. The method may further include generating a security signal when the portable electronic device or the sensor is located inside an authorized perimeter. In addition, the method may further include wirelessly communicating the security signal to a remote location.

In yet another embodiment, an anti-theft device for protecting a portable electronic device from theft or unauthorized removal is provided. The anti-theft device includes a shroud configured to at least partially enclose the portable electronic device, and a dock configured to releasably engage the shroud such that the shroud and portable electronic device are locked to the dock when engaged with the dock. The dock may include at least one finger configured to extend and retract relative to the dock to engage and disengage the shroud. The shroud may include a flexible cable that is configured to transfer power to the portable electronic device when the shroud is engaged with the dock. The flexible cable may include a connector at one end for engaging the portable electronic device and at least one contact at an opposite end, wherein the connector and the at least one contact are in electrical communication with one another. The dock may include at least one contact configured to be in electrical communication with the at least one contact of the flexible cable when the shroud is engaged with the dock for charging the portable electronic device. Moreover, the flexible cable may extend along an interior surface of the shroud. The shroud may include a handle defining a groove and the at least one finger may be biased to extend outwardly to engage the groove. Furthermore, the at least one finger may be configured to automatically engage the shroud when the shroud is placed on the dock. In addition, the dock may include a mechanical lock for unlocking the at least one finger with a mechanical key. Alternatively, the dock may include an electronic lock for unlocking the at least one finger with an electronic key. In one aspect, the electronic lock may include a switch configured to be actuated in response to rotation of the cam for turning the motor on or off. The anti-theft device may include a sensor operably engaged with the shroud. In another aspect, the shroud comprises a handle and a rotatable member, wherein the rotatable member is configured to rotate about the handle. The shroud and the portable electronic device may be configured to rotate relative to the dock when engaged therewith.

According to another embodiment of an anti-theft device, the anti-theft device includes a handle and a plurality of arms each configured to releasably engage the handle and the portable electronic device. The anti-theft device also includes a dock configured to releasably engage the handle such that the handle and the portable electronic device are locked to the dock when engaged with the dock. The dock comprises at least one finger configured to extend and retract relative to the handle to engage and disengage the handle. In one aspect, the portable electronic device is configured to be disengaged from the dock while the plurality of arms remain in engagement with the portable electronic device.

In another embodiment, a method for protecting a portable electronic device from theft or unauthorized removal is provided. The method includes coupling a shroud to a portable electronic device and releasably engaging the shroud with a dock such that the shroud and the portable electronic device are locked to the dock when engaged with the dock. The dock includes at least one finger configured to extend and retract relative to the dock to engage and disengage the shroud. According to an aspect of the method, the coupling step includes at least partially enclosing the portable electronic device with a shroud. The method may further include arming the dock for generating an audible and/or a visible alarm signal in response to the shroud being separated from the dock in an unauthorized manner.

BRIEF DESCRIPTION OF THE DRAWING FIGURES

DETAILED DESCRIPTION OF EMBODIMENTS OF THE INVENTION

Figure 1:
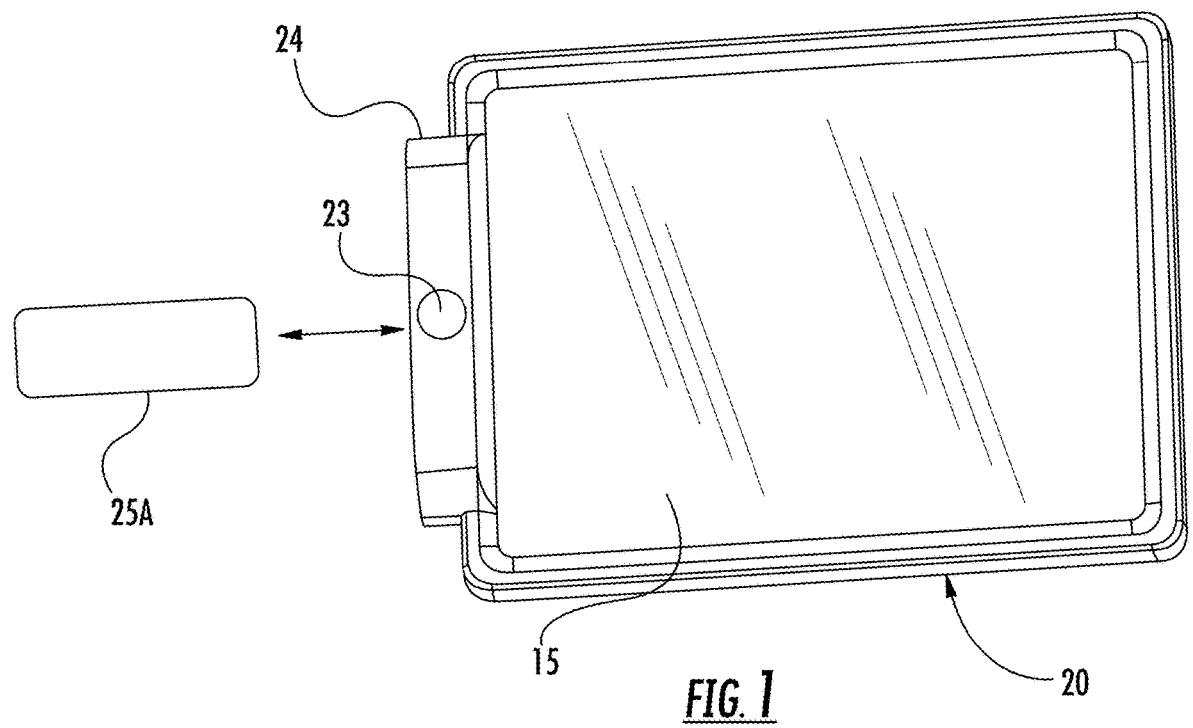
FIG. 1 is a front view of a portable electronic device configured with a sensor for use with an anti-theft device according to the invention.
Figure 2:
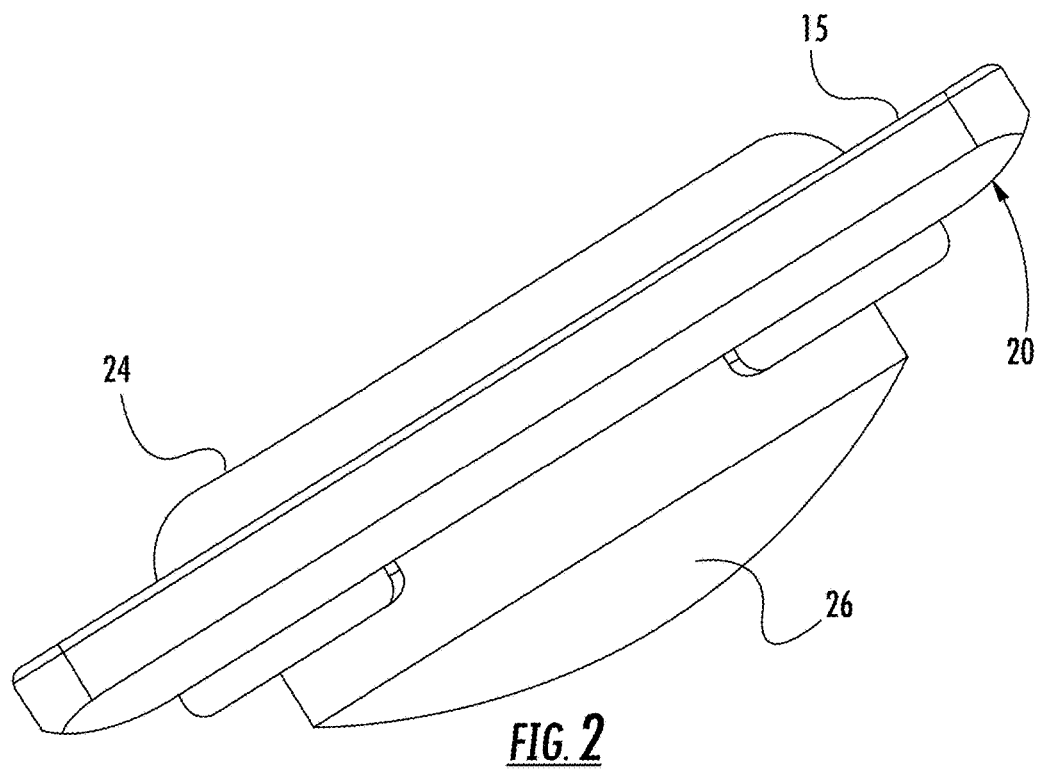
FIG. 2 is a side view of the portable electronic device of FIG. 1.
Figure 3:
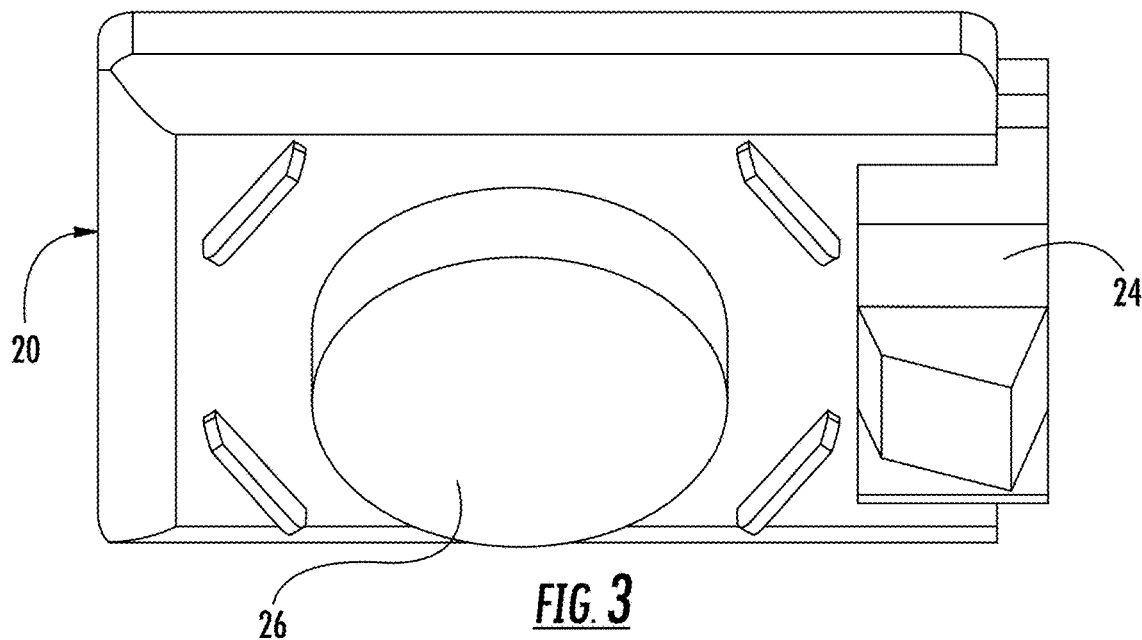
FIG. 3 is a rear view of the portable electronic device of FIG. 1.

Reference will now be made to the accompanying drawing figures wherein identical reference numerals denote the same or similar parts, elements, components, assemblies, subassemblies or the like throughout the various views. The attached drawing figures show exemplary embodiments of an anti-theft device 10 for protecting a portable electronic device 15, for example, a tablet, against theft or unauthorized removal. As used herein, the term "tablet" is intended to include without limitation all types of portable, personal computers, for example, laptop, notebook, mini-notebook, sub-notebook and netbook type computers, as well as personal data assistant (PDA) and personal mobile communications (e.g., cell phone) type devices. The anti-theft device 10 may be suitable for use by customers or employees, such as a retail store associate, a teacher, a nurse, a maintenance worker, or an airline pilot/attendant, in a variety of locations.

Figure 6:
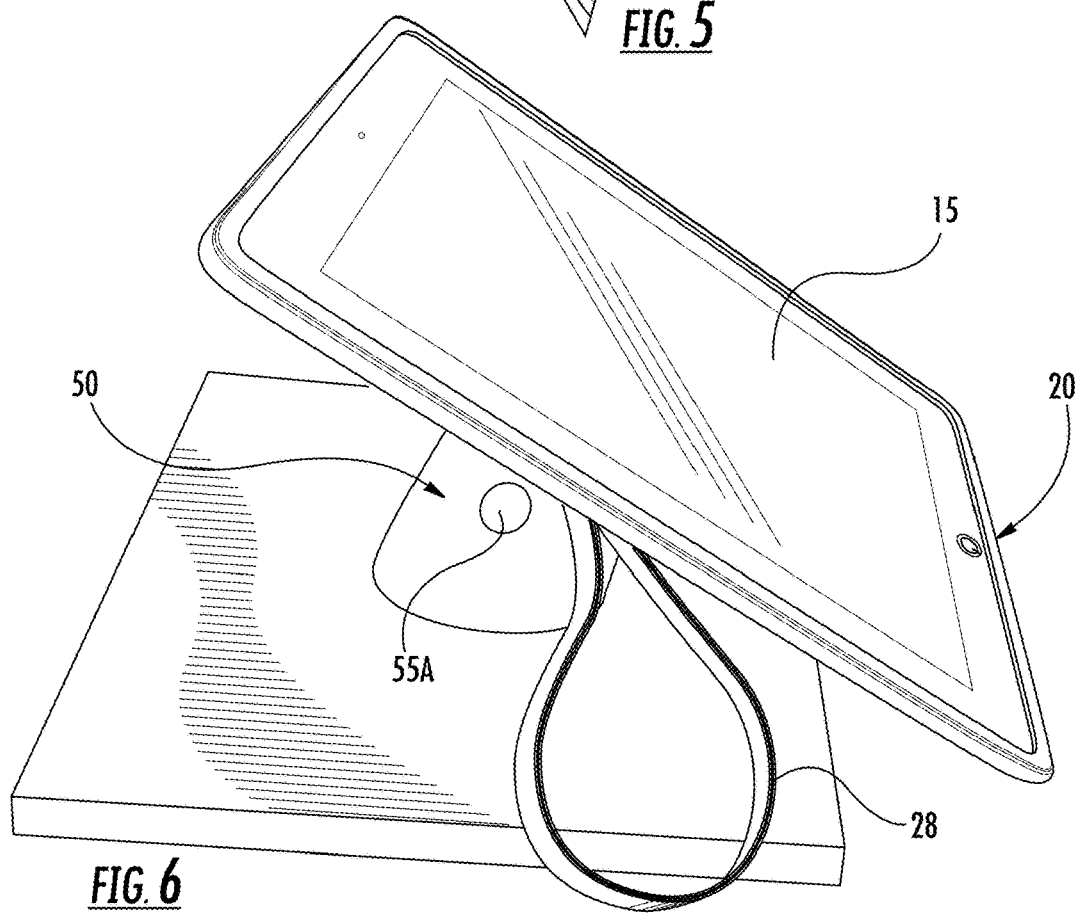
FIG. 6 is a perspective view showing the portable electronic device of FIG. 4 and the shroud of FIG. 4 disposed on a dock.
Figure 7:
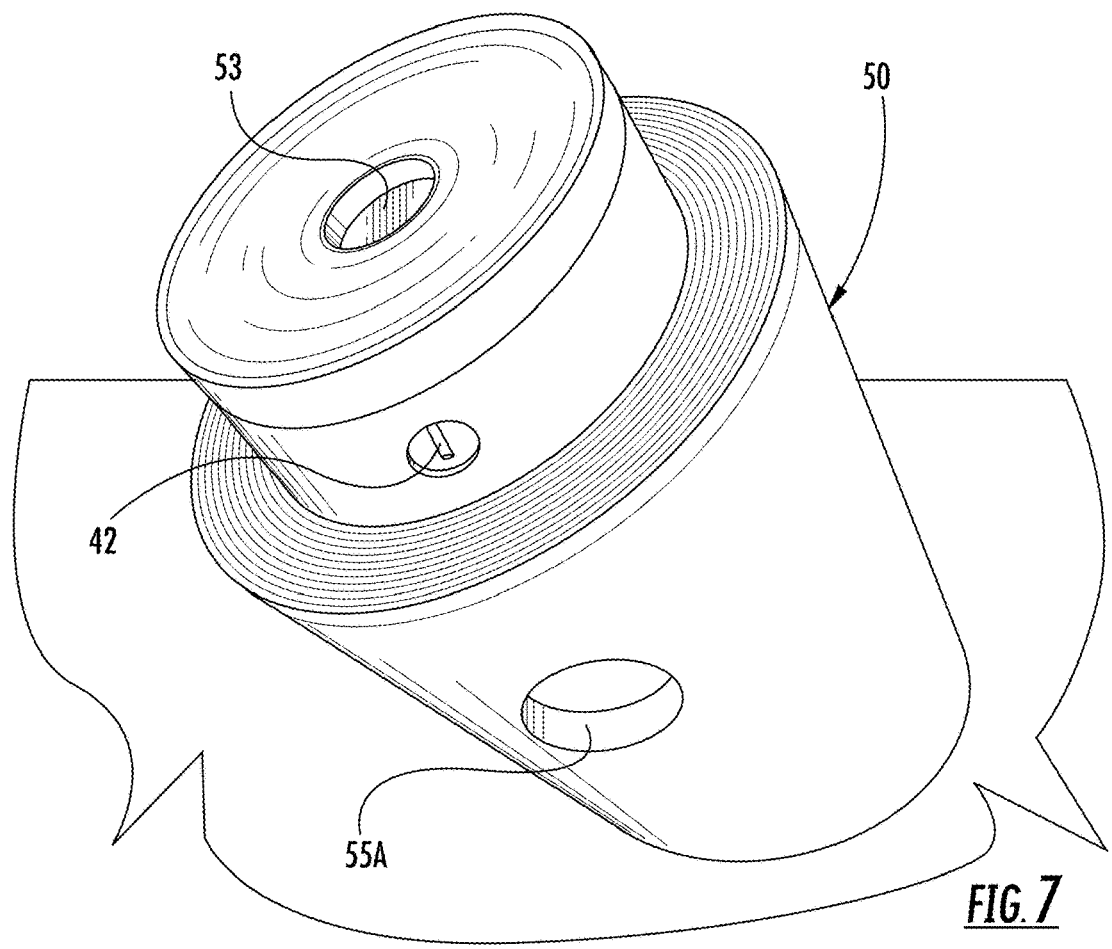
FIG. 7 is a perspective view showing the dock of FIG. 6 in greater detail with the portable electronic device and the shroud removed.

FIG. 1 shows a portable electronic device 15, and in particular a tablet, for use with an anti-theft device 10 according to the invention. In one embodiment, the anti-theft device 10 includes a shroud 20 that is configured to at least partially enclose the portable electronic device 15 (see, e.g., FIG. 1, FIG. 4, FIG. 6. FIG. 8, FIG. 10, FIG. 13 and FIG. 15). The shroud 20 may include a sensor 24 attached to or otherwise integrated therewith. The shroud 20 may simply be secured to the portable electronic device 15 with a sensor 24 such that the sensor is configured to generate a notification signal when the shroud is removed, or when the portable electronic device 15 and the sensor 24 are separated. Alternatively, the shroud 20 may be locked to the portable electronic device 15 such that a key 25A or 25B or other authorization (e.g., pass code) is required to remove the shroud. For example, the shroud 20 may define an electrical sense loop with the portable electronic device 15 such that removal of the shroud results in the generation of an alarm signal. The shroud 20 may include further functionality, such as a GPS receiver or the like, for identifying the location of the shroud, and/or an EAS tag. In one embodiment, the shroud 20 is configured to communicate with a remote device, base unit or station. For example, the shroud 20 may be configured to communicate a security signal to a remote base unit to provide notification to the base unit. Moreover, the shroud 20 and/or the portable electronic device 15 may be configured to communicate with a remote device or remote base unit for locking/unlocking the shroud from a docking station or dock (individually and collectively referred to hereinafter as dock 50), and/or for arming/disarming the dock 50. Such communications may occur wirelessly using any suitable communications protocol (e.g., WiFi, Bluetooth, 3G, 4G, etc.).

As previously mentioned, a sensor 24 may be coupled to the portable electronic device 15. The sensor 24 and/or portable electronic device 15 is configured to generate a notification signal when the portable electronic device is separated from the sensor. For example, the sensor 24 and/or portable electronic device 15 may be configured to generate a security signal (e.g., an audible, a visible and/or haptic alarm) in response to detecting a security event. In one embodiment, the sensor 24 is integrated with the portable electronic device 15, such as within a battery compartment of the device, or by being embedded or molded therein. The sensor 24 may be attached to the portable electronic device 15, such as using a variety of techniques, including a pressure-sensitive adhesive, a shroud, a clamp, or attaching to one or more ports on the device. In yet another embodiment, the existing components of the portable electronic device 15 may be configured to generate a notification signal. Thus, a software application may be provided that configures the portable electronic device 15 with the functionality.

In one embodiment, the sensor 24 is an EAS tag this is configured to cooperate with an EAS tower or controller to generate a notification signal should the tower or controller detect the EAS tag. Thus, the EAS tower or controller may be configured to cause the sensor 24 to generate a notification signal should a security event be detected. In another embodiment, the anti-theft device 10 may include both a sensor 24 and an EAS tag. In one embodiment, the portable electronic device 15 includes software for communicating with an EAS tower and generating a security signal based on communication with the tower.

Figure 4:
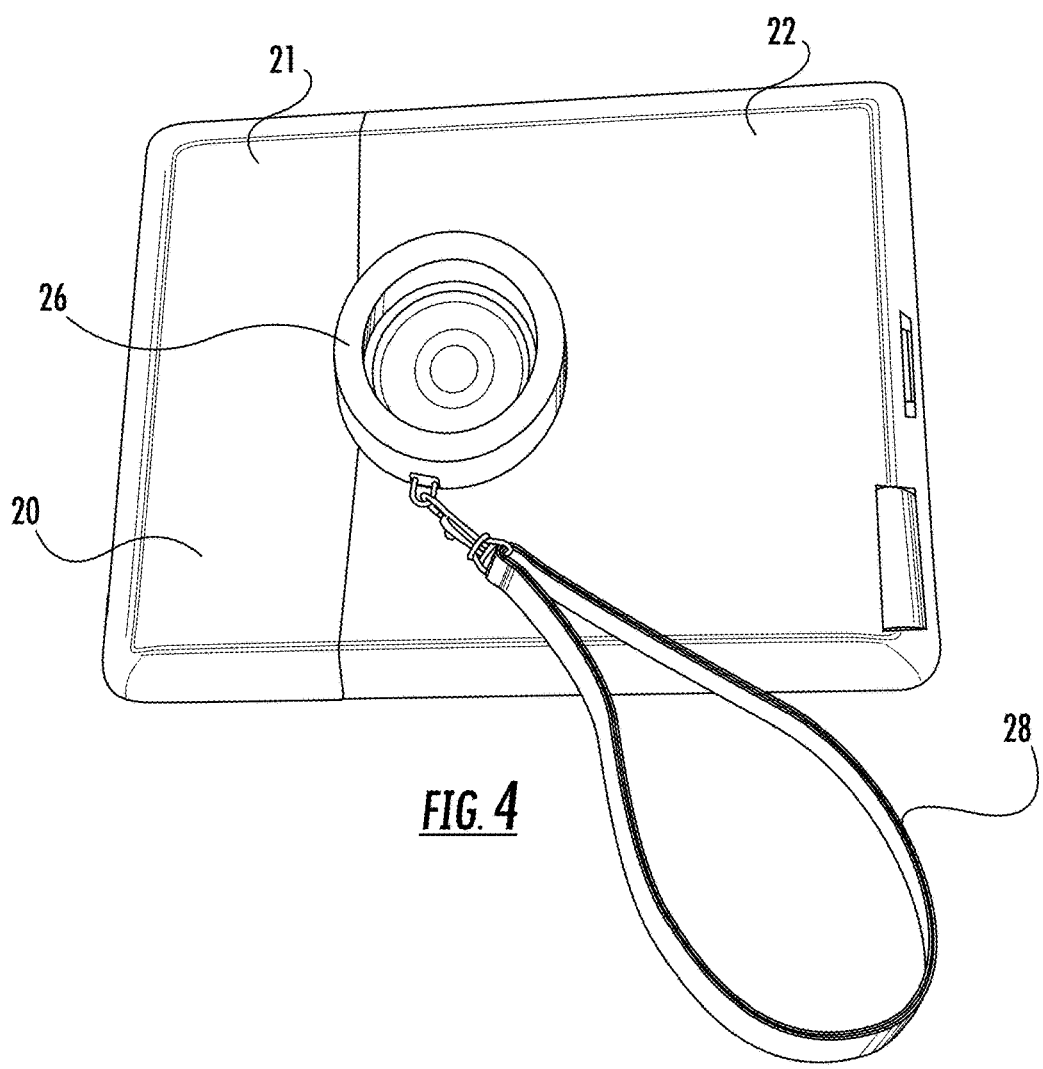
FIG. 4 is a rear view of another portable electronic device configured with a shroud for use with an anti-theft device according to the invention.
Figure 5:
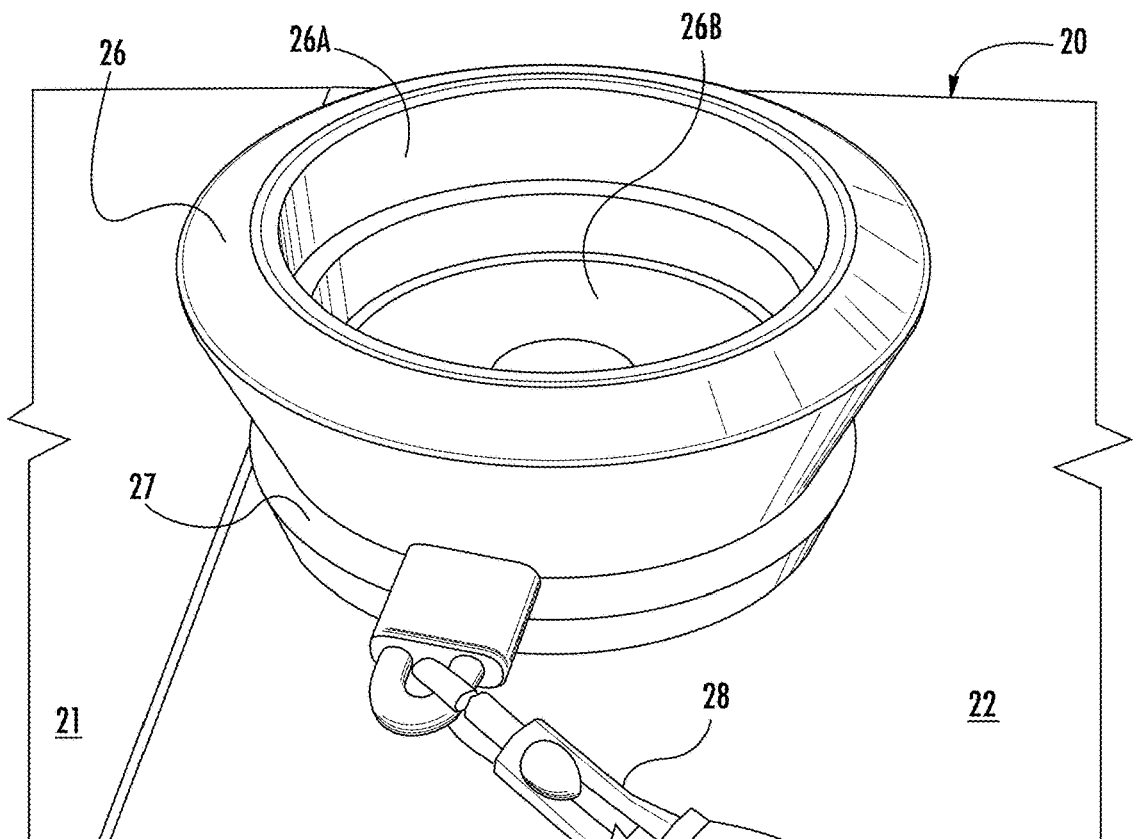
FIG. 5 is a detail view showing the handle of the shroud of FIG. 4.
Figure 10:
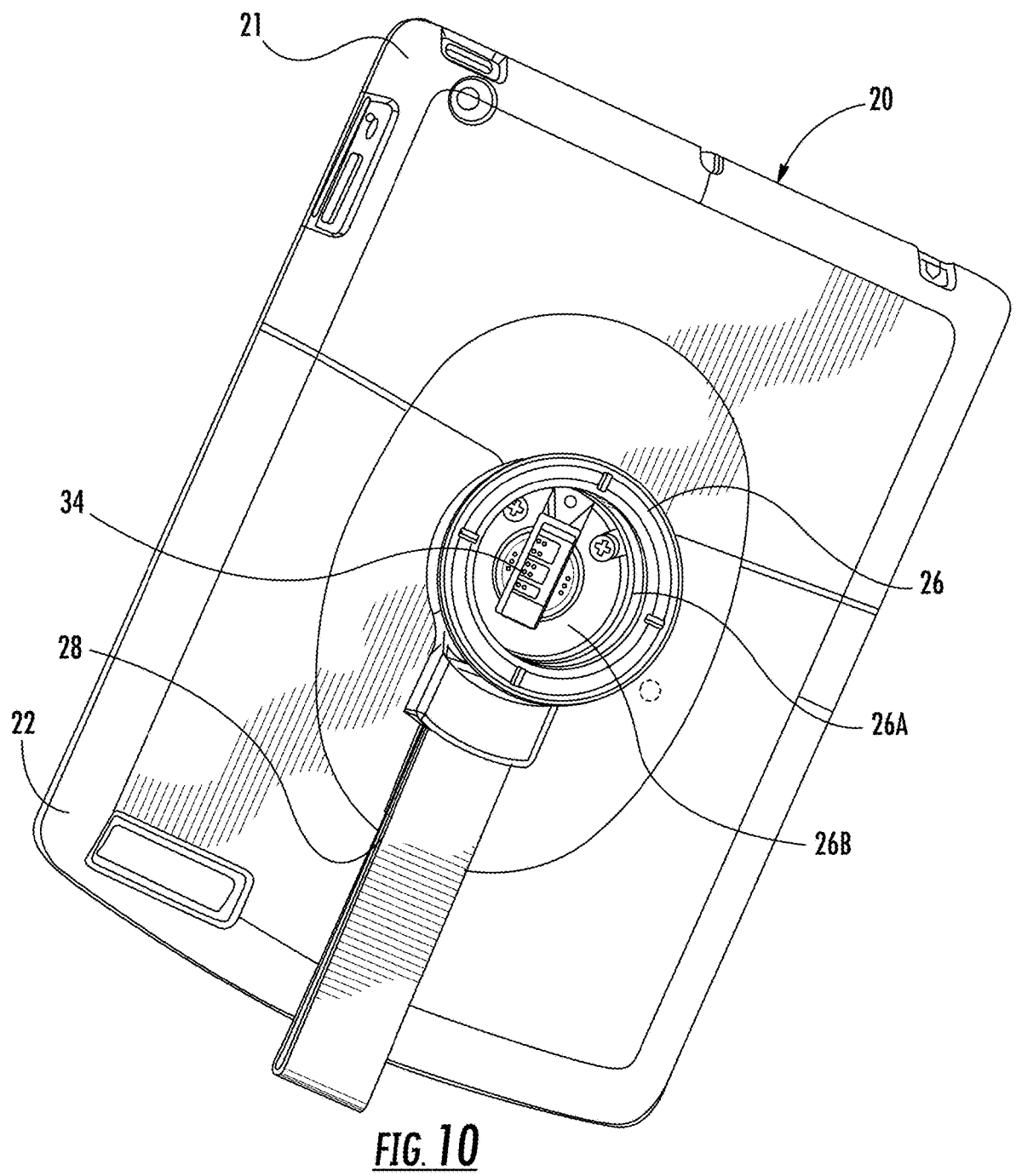
FIG. 10 is a perspective view showing the portable electronic device and the shroud of FIG. 8.

In some embodiments, the shroud 20 includes a handle 26 and/or strap 28 for facilitating case of handling the portable electronic device 15 (see, e.g., FIG. 4 and FIG. 10). The handle 26 and/or strap 28 may utilize other features, such as a swivel or rotatable component, that allows the handle and/or strap to rotate at least 360 degrees about an orthogonal axis for ease of use (see, e.g., FIG. 5). The handle 26 and/or strap 28 may include any suitable means to facilitate rotation, such as a bearing structure that allows pivoting relative to the handle and/or strap. For example, an embodiment of the anti-theft device shown in FIG. 4 and FIG. 5 includes a rotatable member 27 mounted for rotation with respect to a handle 26 or other engagement feature, such that the rotatable member 27 may rotate freely with respect to the handle 26 or engagement feature. The shroud 20 could also be tethered to the user or to a fixed object to provide further security, for example, with a clip or a strap 28. The shroud 20 may be configured to at least partially encapsulate the portable electronic device 15 and may be formed of various suitable materials, such as a relatively rigid polymeric material. The shroud 20 may be sized and configured to closely conform to the shape of the portable electronic device 15. For example, FIGS. 4, 10, 11, and 15 illustrate embodiments of a shroud 20 including a first member 21 and a second member 22 that are configured to cover the rear of the portable electronic device 15 and to engage the opposite ends and the opposite sides of the portable electronic device 15. Thus, the shroud 20 may surround the periphery (e.g., the sides and ends) of the portable electronic device 15. The first and second members 21, 22 may be engaged with one another in any desired manner, such as in a press fit, snap fit, fasteners, etc.

As previously mentioned, the anti-theft device 10 may further include a dock 50 for receiving and supporting the portable electronic device 15 (see e.g., FIGS. 6, 13, 16 and 18). The dock 50 may be configured to temporarily secure the portable electronic device 15 thereto. In turn, the dock 50 may be configured to be fixed to a support surface, such as a fixture, a counter, a wall, or the like, for example, with one or more fasteners 51 (see, e.g., FIG. 8A and FIG. 13) and/or adhesive. In some instances, the portable electronic device 15 is configured to be readily placed within the dock 50 and removed by an authorized user. For example, a retail store associate may utilize a tablet 15 for point-of-sale transactions and wish to temporarily secure the tablet against theft or unauthorized removal. As such, the dock 50 may also be configured to be alarmed, locked, and/or otherwise secured so that unauthorized persons cannot remove the portable electronic device 15. In one embodiment, the dock 50 includes an alarming device (e.g., an alarm 52 and monitoring electronics 54) configured to arm when the portable electronic device 15 is positioned within the dock, and to disarm when the portable electronic device is removed by an authorized user. The portable electronic device 15 may be operably engaged with the dock 50 and/or with an alarming device in a wireless manner (i.e., no tether is required), although wired means may be used if desired.

The dock 50 may include an alarm 52 and monitoring electronics 54 for activating the alarm in the event that the shroud 20 and the portable electronic device 15 are detached from the dock in an unauthorized manner. The monitoring electronics 54 may be configured to monitor one or more sensors or switches and to activate an audible or visible alarm signal in response to a security event. Moreover, the dock 50 may include a processor or controller that is operably engaged with the monitoring electronics 54, a motor, switches, an alarm, etc.

The drawing figures show exemplary embodiments of a dock 50 configured to support and secure the portable electronic device 15, although other shapes and configurations are possible for supporting a variety of portable electronic devices. For example, the shroud 20 may include a handle 26 or other engagement member that is configured to mate with a corresponding engagement feature of the dock 50. Moreover, the dock 50 may be configured to support the portable electronic device 15 in one of a plurality of desired orientations (e.g., portrait or landscape). Alternatively, the shroud 20 may be configured to rotate about the dock so as to be positioned in any desired orientation (e.g., rotatable 360 degrees).

The dock 50 may include a mechanical mechanism or sensor, such as a pressure or plunger switch, operably engaged with the alarm 52 and monitoring electronics 54 that is configured to activate in response to engagement and disengagement with the portable electronic device 15 and/or the shroud 20. Likewise, the dock 50 may include a mechanical mechanism or sensor that is configured to sense if the dock has been removed from a support surface in an unauthorized manner. The authorized user may utilize a key 25A or 25B, pass code, or the like to disarm the alarm 52 and monitoring electronics 54. In some embodiments, the dock 50 is configured to power and/or charge a portable electronic device 15 that is docked on the dock. In this case, the anti-theft device 10 may include a power cord coupled to the dock 50, inductive charging functionality, or contact charging functionality. For example, the dock 50 may pass power to the portable electronic device 15 with a power cord 32A that is connected to a power input port of the portable electronic device via a connector 36 (see, e.g., FIGS. 13, 15, and 16). In some cases, an OEM cable 32A may be used for charging the portable electronic device 15 and may be routed from the dock 50 to the portable electronic device. An LED or other signaling device may be used to indicate that the anti-theft device 10 is armed. In addition, the alarm 52 and monitoring electronics 54 may be configured to generate an alarm signal (e.g., an audible and/or visible alarm) in response to unauthorized removal of the portable electronic device 15 and/or shroud 20 from the dock 50.

Figure 9:
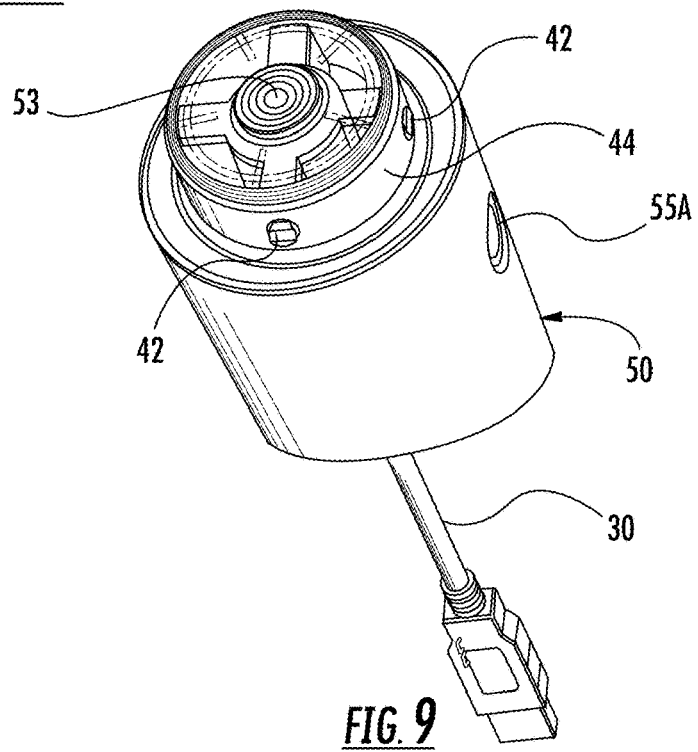
FIG. 9 is a perspective view showing a dock of the anti-theft device of FIG. 8 with the portable electronic device and the shroud removed.

In some embodiments, the shroud 20 may include a power source for powering the portable electronic device 15. For example, the shroud 20 could include a battery that is configured to provide power to the portable electronic device 15 while the portable electronic device is undocked from the dock 50. Thus, the shroud 20 may be configured to extend the battery life of an undocked portable electronic device 15. Moreover, the portable electronic device 15 may also be configured to be charged while docked. For instance, the shroud 20 may be configured to facilitate passing power to the portable electronic device 15. In this regard, the shroud 20 may include a cable, connector, or the like for passing electrical power from the dock 50 to the portable electronic device 15 to power the internal battery of the portable electronic device 15. For example, FIG. 9 shows a dock 50 electrically connected to a cable 30 that may be coupled to an external power source (not shown). When the shroud 20 is docked on the dock 50, the dock is configured to pass power to the shroud and/or the portable electronic device 15. The cable 30 may also provide power to the alarm 52 and/or monitoring electronics 54 within the dock 50.

Figure 11:
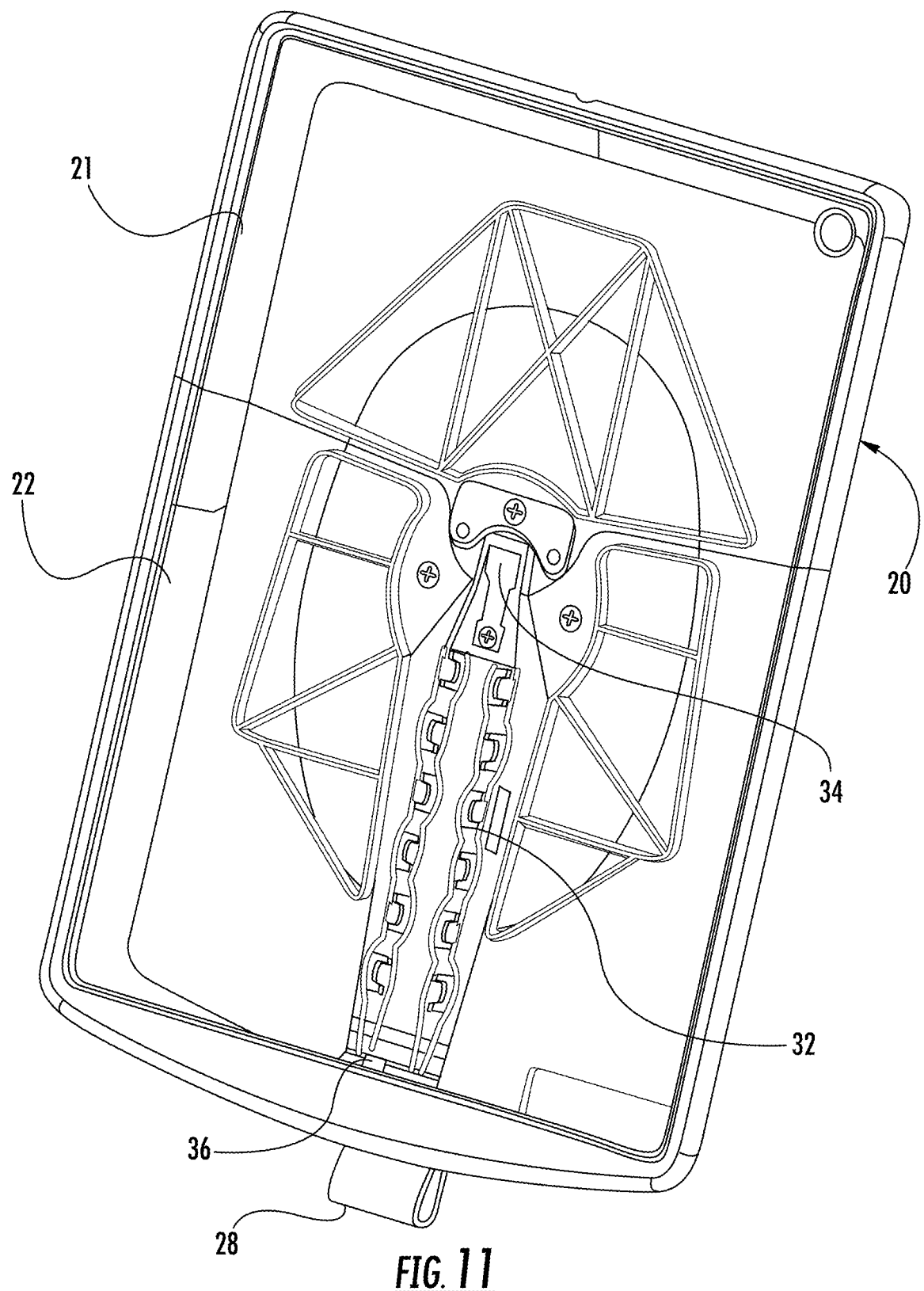
FIG. 11 is a perspective view showing the opposite side of the shroud of FIG. 10.
Figure 12:
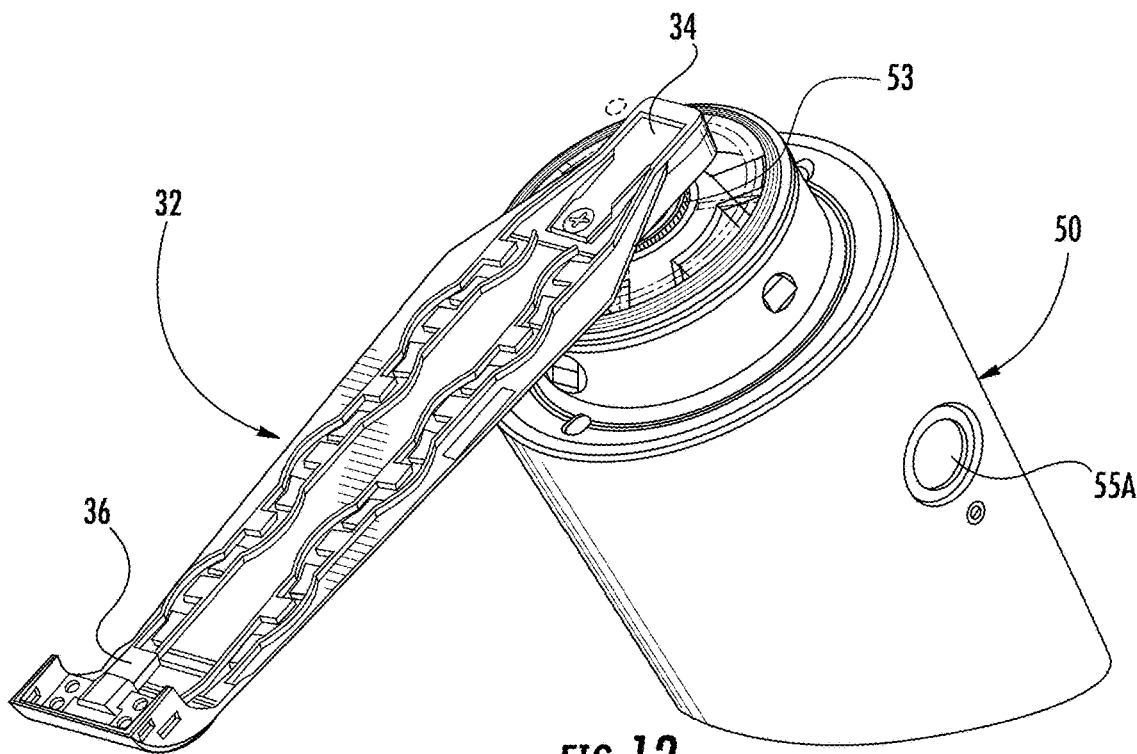
FIG. 12 is a perspective view showing the dock and a portion of the shroud of the anti-theft device of FIG. 8 in greater detail with the remainder of the shroud and the portable electronic device removed.

In one embodiment, FIG. 11 shows a shroud 20 that includes a flexible cord, cable, ribbon, substrate, or the like 32 that includes one or more electrical contact(s) 34 at one end for electrically communicating with the dock 50, and a connector 36 at an opposite end for engaging a power and/or data input port on the portable electronic device 15. FIG. 12 shows the flexible cable 32 in a docked position on the dock 50 and with the shroud 20 removed for purposes of clarity. The flexible cable 32 may include one or more electrical conductors (e.g., power and ground) extending between the contact(s) 34 and the connector 36. The conductors may be coupled to a flexible substrate (e.g., a polymer material). The connector 36 may be any suitable connector configured to engage a power and/or data input port of the portable electronic device 15, for example a micro-USB connector. In one embodiment, the contacts 34 at the end of the flexible cable 32 may extend through an opening defined in the shroud 20 so as to be configured to electrically connect to one or more corresponding contacts 53 provided on the dock 50 to facilitate contact charging when the shroud is engaged with the dock. The flexible cable 32 may be positioned within the shroud 20 such that the flexible cable extends along an interior surface of the shroud. The flexible cable 32 may be coupled to the shroud 20 and be of a low profile (e.g., flat or ribbon-like), such that the cable is not visible when the portable electronic device 15 is secured within the shroud and does not hinder placement of the portable electronic device within the shroud (see, e.g., the cross-sectional view shown in FIG. 8A). The electrical contact between the contacts 34 of the flexible cable 32 and the corresponding contacts 53 provided on the dock 50 may also define a detectable sense loop that is in electrical connection with the monitoring electronics 54. Thus, should the shroud 20 be removed from the dock 50 in an unauthorized manner (e.g., without first disarming the monitoring electronics 54 with a key 25A), the monitoring electronics may sense the break in the sense loop and generate an alarm signal.

In some embodiments, the anti-theft device 10 comprises a lock mechanism 40 for securing the portable electronic device 15 on the dock 50. The lock mechanism 40 may include any combination of electrical, magnetic, inductive, and/or mechanical interaction. For example, the lock mechanism 40 may be configured to automatically lock when the portable electronic device 15 is positioned onto the dock 50. In one embodiment shown in FIGS. 7-12, the dock 50 may include one or more fingers 42 that are configured to extend and retract relative to the dock. For example, the dock 50 may include a pair of opposing fingers 42 at radially opposite locations. Alternatively, or in addition, the dock 50 may include any number of fingers 42, for example, a plurality of fingers spaced equidistantly from one another around the periphery of the dock. The fingers 42 may be configured to automatically extend outwardly to engage the shroud 20 when the shroud with the portable electronic device 15 is placed onto the dock 50.

Figure 15:
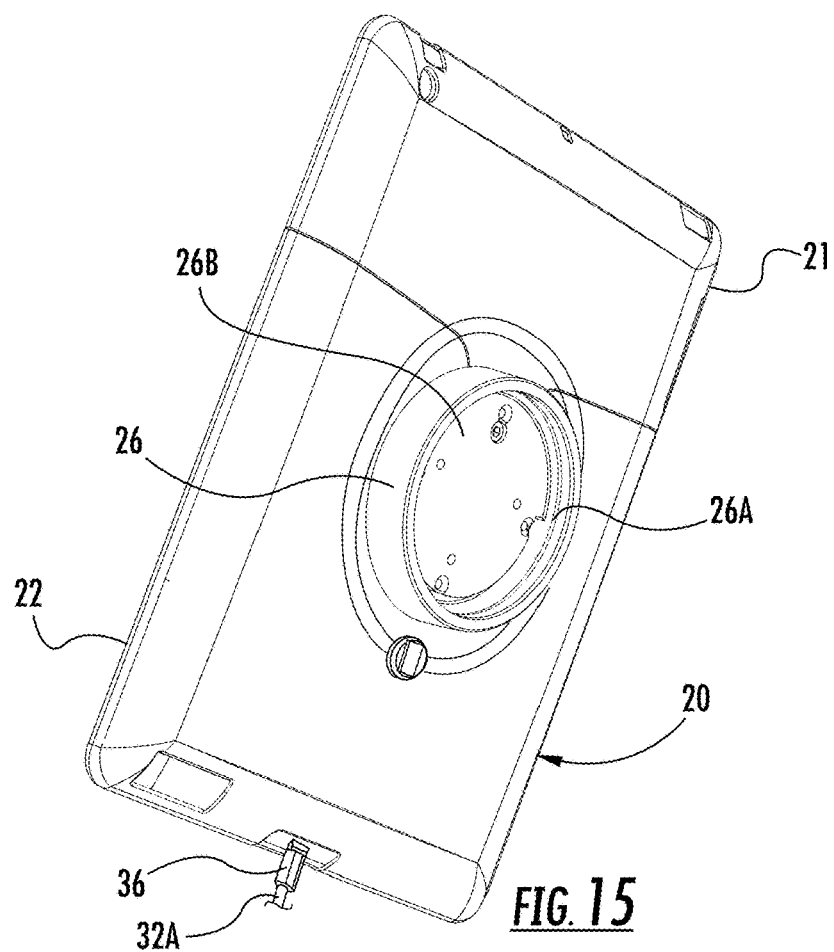
FIG. 15 is a perspective view showing the shroud and the portable electronic device of FIG. 13.

For example, the fingers 42 may be spring-biased towards an extended position, or be configured to automatically extend outwardly in response to the monitoring electronics 54 of the dock 50 detecting the presence of the shroud 20. In some embodiments, the shroud 20 includes a handle 26 defining an internal groove or slot 26A (see, e.g., FIGS. 10 and 15) that is configured to mate with the finger(s) 42. The groove or slot 26A may extend at least partially about the circumference of the handle 26, and in some embodiments, about the entire circumference. The groove or slot 26A may be configured to allow the shroud 20 to pivot to a particular orientation(s) relative to the dock 50. As shown in FIG. 9, the dock 50 may include a raised protrusion 44, and the fingers 42 may be configured to extend/retract relative to the protrusion. The handle 26 may include an opening 26B having a depth that is configured to mate with the protrusion 44, and thereby align the groove or slot 26A with the fingers 42 when the shroud 20 is positioned onto the dock 50. FIG. 15 shows another embodiment of a shroud 20 that is configured to be engaged by a dock 50. In this embodiment, the dock 50 also includes a plurality of fingers 42 that are configured to extend outwardly to engage a groove or slot 26A defined within a handle 26 of the shroud 20.

Figure 8:
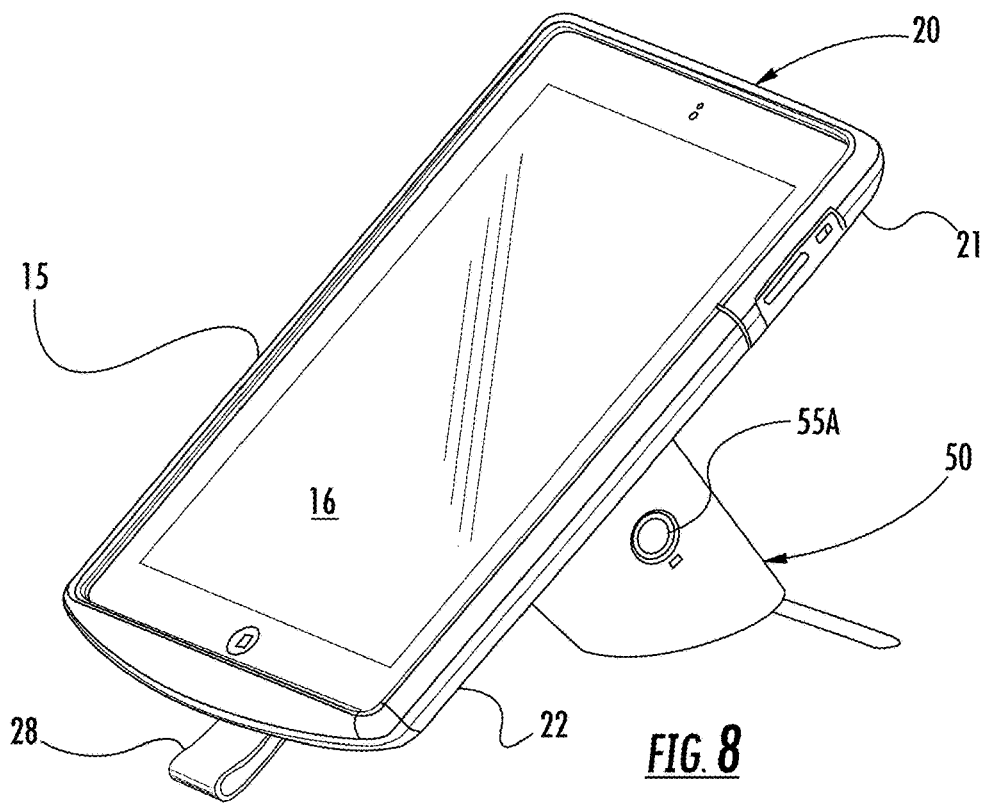
FIG. 8 is a perspective view showing another anti-theft device for protecting a portable electronic device according to the invention.
Figure 8A:
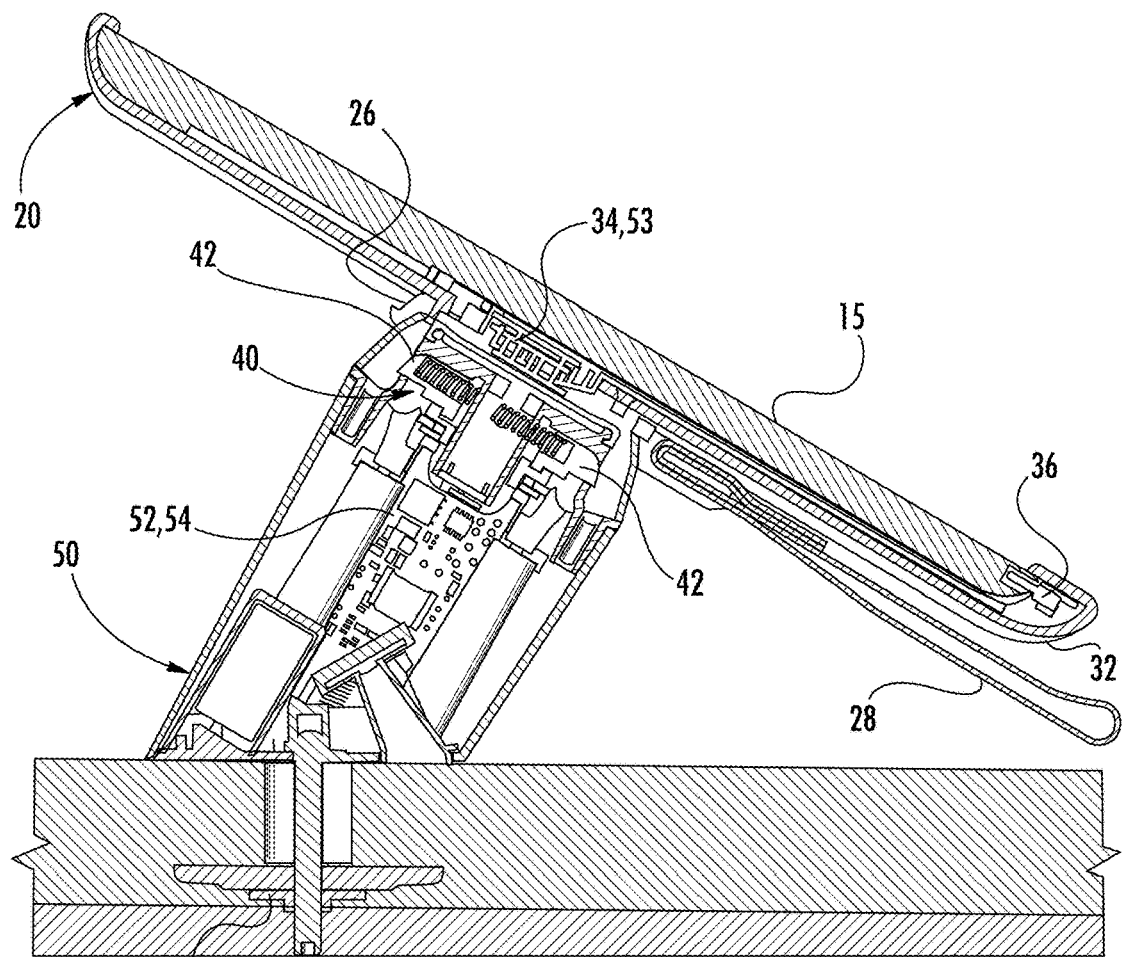
FIG. 8A is a cross-sectional view showing the anti-theft device and the portable electronic device of FIG. 8.
Figure 13:
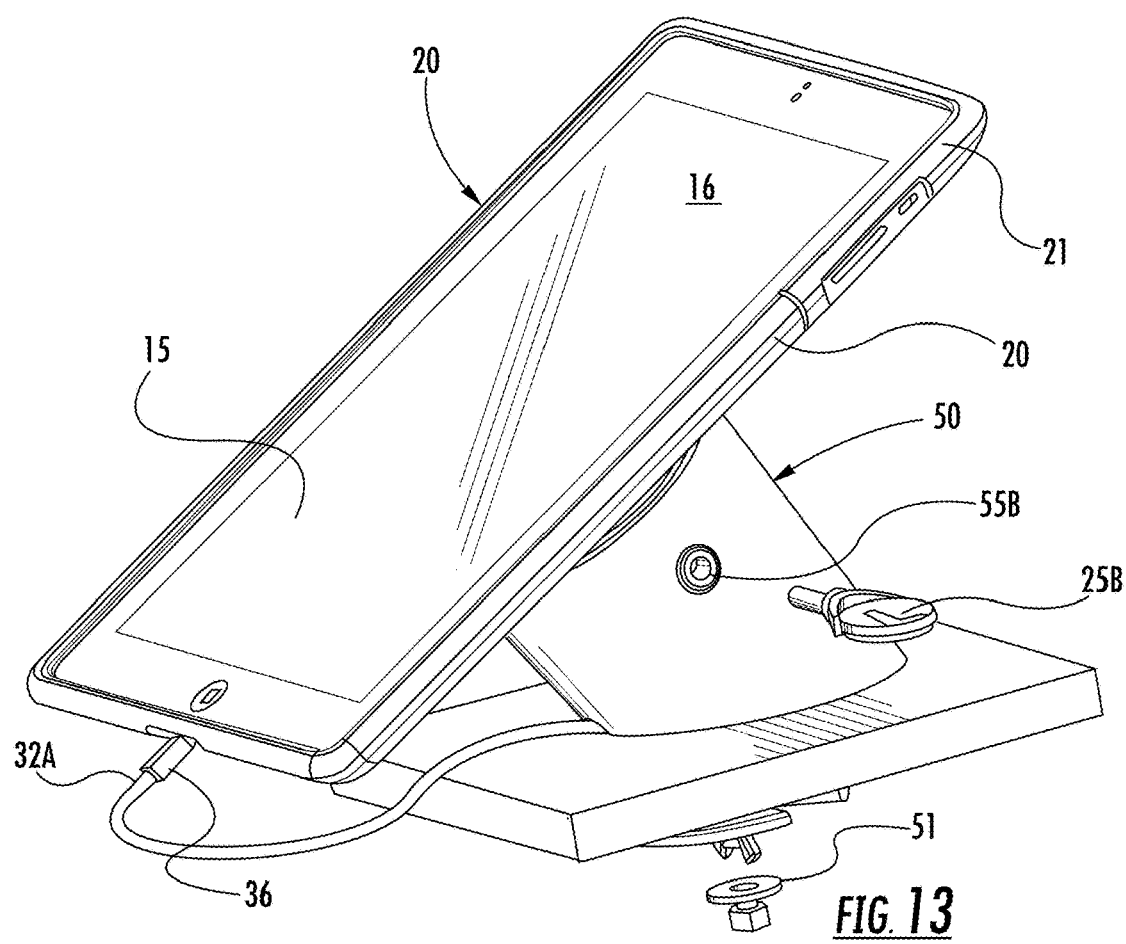
FIG. 13 is a perspective view showing another anti-theft device for protecting a portable electronic device according to the invention.
Figure 14:
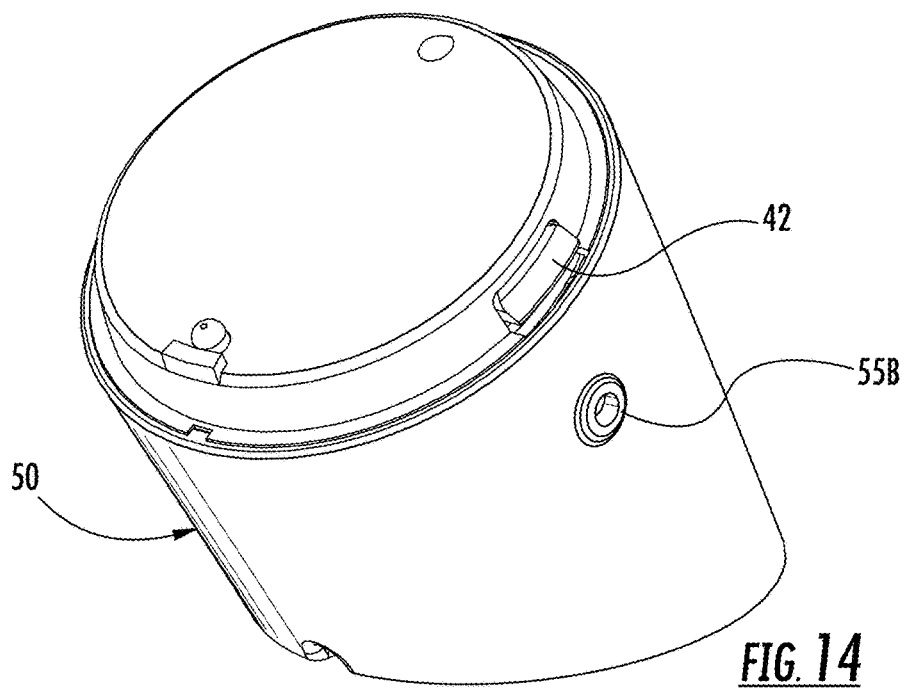
FIG. 14 is a perspective view showing a dock of the anti-theft device of FIG. 13.

In order to release the shroud 20 and the portable electronic device 15 from the dock 50, an authorized user could use an electronic key 25A or other suitable security means (e.g. a pass code) to disarm the alarming device (e.g., alarm 52 and monitoring electronics 54) and/or disengage the lock mechanism 40. For example, FIG. 8 shows that the dock 50 includes a port 55A for communicating with an electronic key 25A for arming and/or disarming the alarming device. FIG. 13 and FIG. 14 show another exemplary embodiment of an anti-theft device 10 according to the invention wherein a mechanical key 25B is configured to mechanically engage a lock 55B to lock or unlock the shroud 20 from the dock 50. Thus, an authorized user may utilize a mechanical key 25B for manually moving the fingers 42 to an unlocked position, and in some cases, to a locked position. In some instances, a customized shroud or shroud adapter may be operably engaged with the portable electronic device 15 that is configured to engage with the lock mechanism 40. This may be accomplished with a shroud 20 that covers the portable electronic device 15 except for the display 16, but could be accomplished in other ways, for example, by attaching locking features to the back of the portable electronic device 15, for example using an adhesive.

Figure 14A:
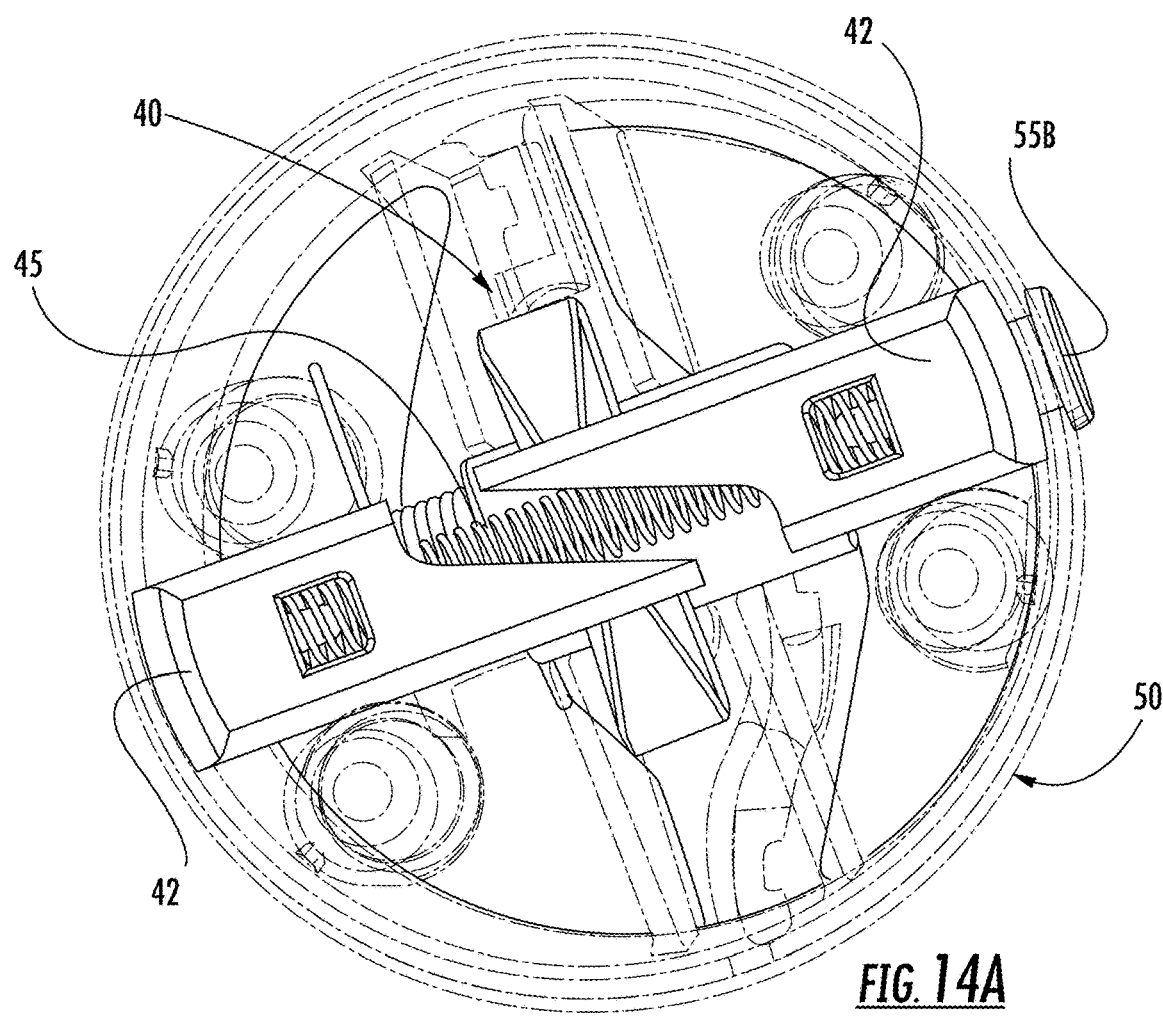
FIG. 14A is a partial top view showing a mechanical lock mechanism for the dock of the anti-theft device of FIG. 13.
Figure 14B:
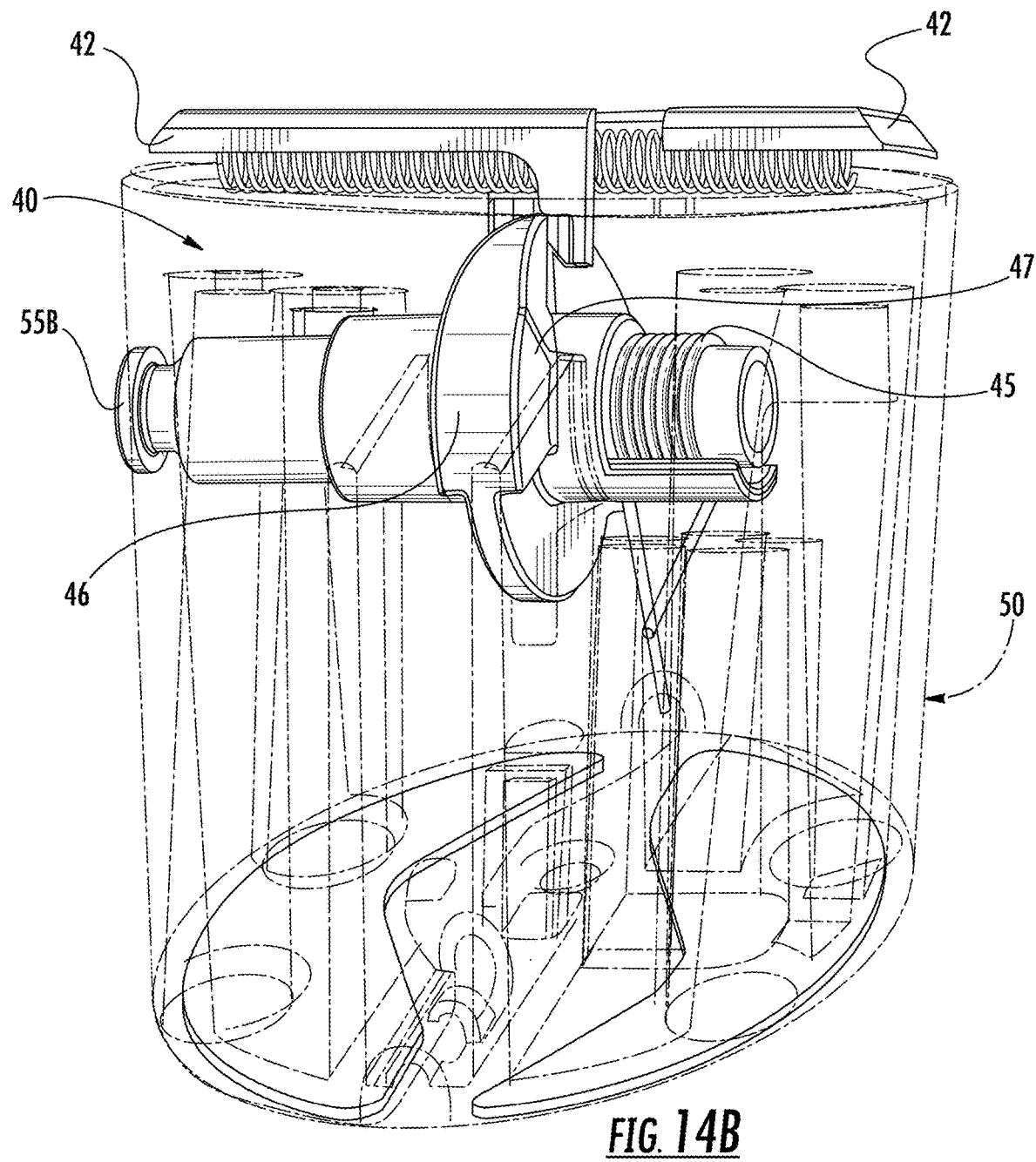
FIG. 14B is a partial perspective view showing the mechanical lock mechanism for the dock of the anti-theft device of FIG. 13.

FIG. 14A and FIG. 14B show one embodiment of a mechanical lock mechanism 40. In this embodiment, a pair of fingers 42 is disposed on radially opposite sides of the dock 50. The fingers 42 may be spring-biased towards an extended position relative to the dock 50. FIG. 14A is a partial top view of the dock 50 for the purpose of illustrating the mechanical lock mechanism 40. As shown, the fingers 42 may be separated from one another in an extended position such that the gap therebetween allows the fingers to be retracted towards one another to disengage from the shroud 20. A spring 45 may engage both fingers and thereby bias the fingers away from one another. In order to facilitate retraction of the fingers 42, the lock mechanism 40 may include a mechanically actuated lock 55B. In this regard, FIG. 14B shows a partial perspective view of the dock 50 wherein the mechanical lock mechanism 40 is configured to be engaged by a mechanical key 25B (FIG. 13). Rotation of the mechanical key 25B results in rotation of a cam 46 that is configured to engage each of the fingers 42. In this regard, the cam 46 may be a disk member with a camming surface 47 on opposing sides, wherein each camming surface 47 is configured to engage a respective finger 42. As the camming surface 47 rotates it engages the corresponding finger 42 and forces the finger inwardly to overcome the biasing force of the spring 45, and thereby retract the fingers within the dock 50. The cam 46 may also be spring-biased such that releasing the mechanical key 25B (FIG. 13) results in biasing of the cam 46 in an opposite direction to thereby allow the fingers 42 to extend outwardly from the dock 50. The fingers 42 are configured such that placement of the shroud 20 on the dock 50 allows the handle 26 to slide over and engage the fingers 42 so as to overcome the biasing force of the spring 45 and urge the fingers inwardly until the shroud is seated on the dock. Once seated on the dock 50, the fingers 42 are aligned with the groove or slot 26A defined in the handle 26 of the shroud 20 and allowed to bias outwardly again.

Another embodiment of a lock mechanism 40 includes an electro-mechanical connection between the dock 50 and the shroud 20 and/or portable electronic device 15. For instance, an electro-mechanical lock may be configured to move into place when triggered by the portable electronic device 15 being docked, such as with one or more pressure switches, optical switches, or similar means of detecting the presence of the portable electronic device 15.

Figure 9A:
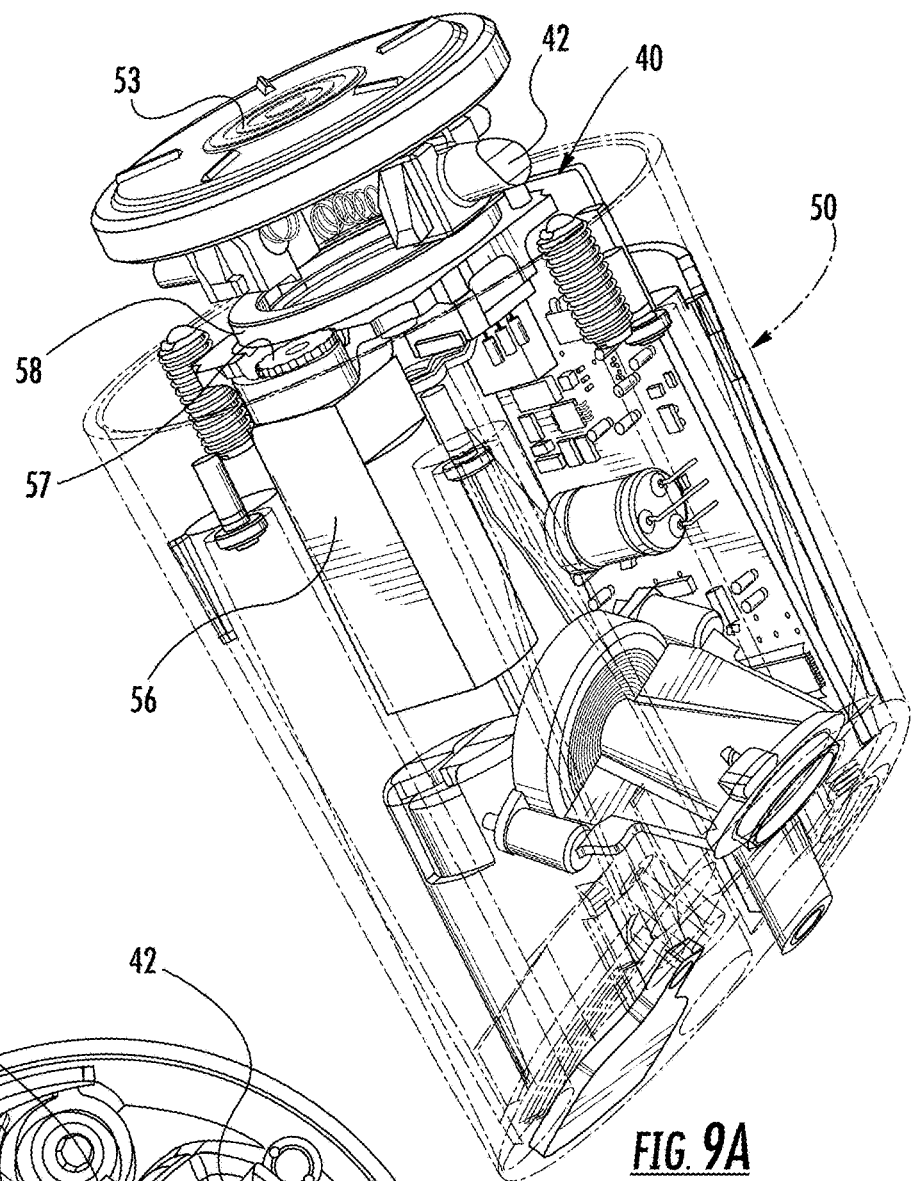
FIG. 9A is a partial perspective view showing an electro-mechanical lock mechanism for the dock of the anti-theft device of FIG. 8.
Figure 9B:
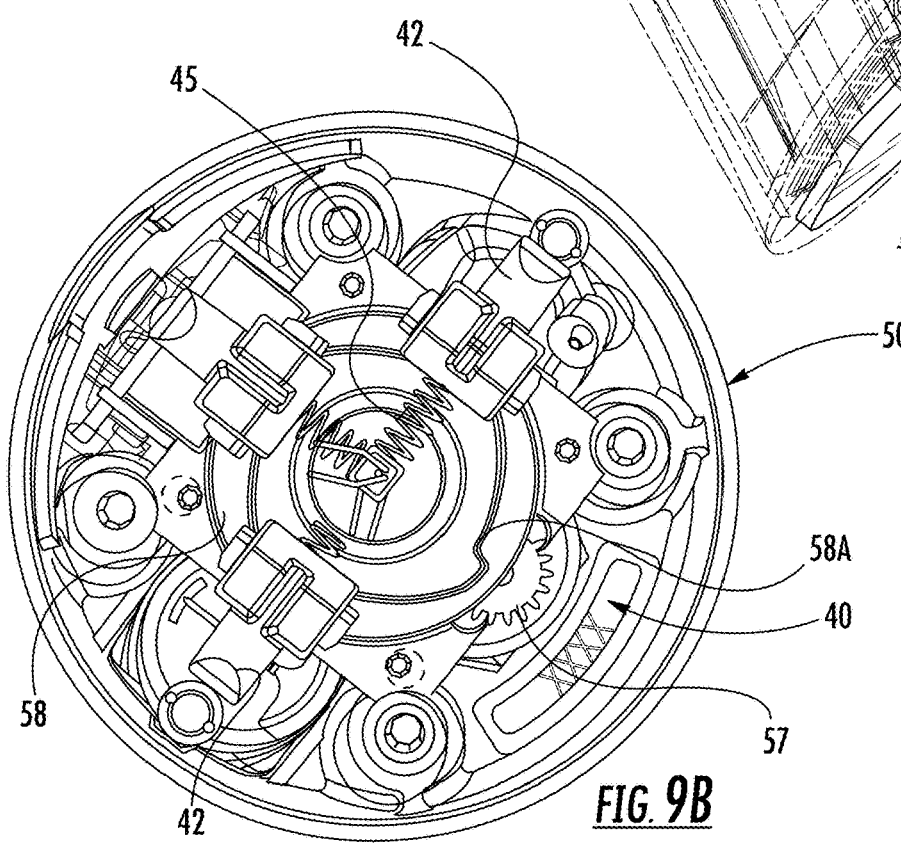
FIG. 9B is a partial top view showing the electro-mechanical lock mechanism for the dock of the anti-theft device of FIG. 8.
Figure 9C:
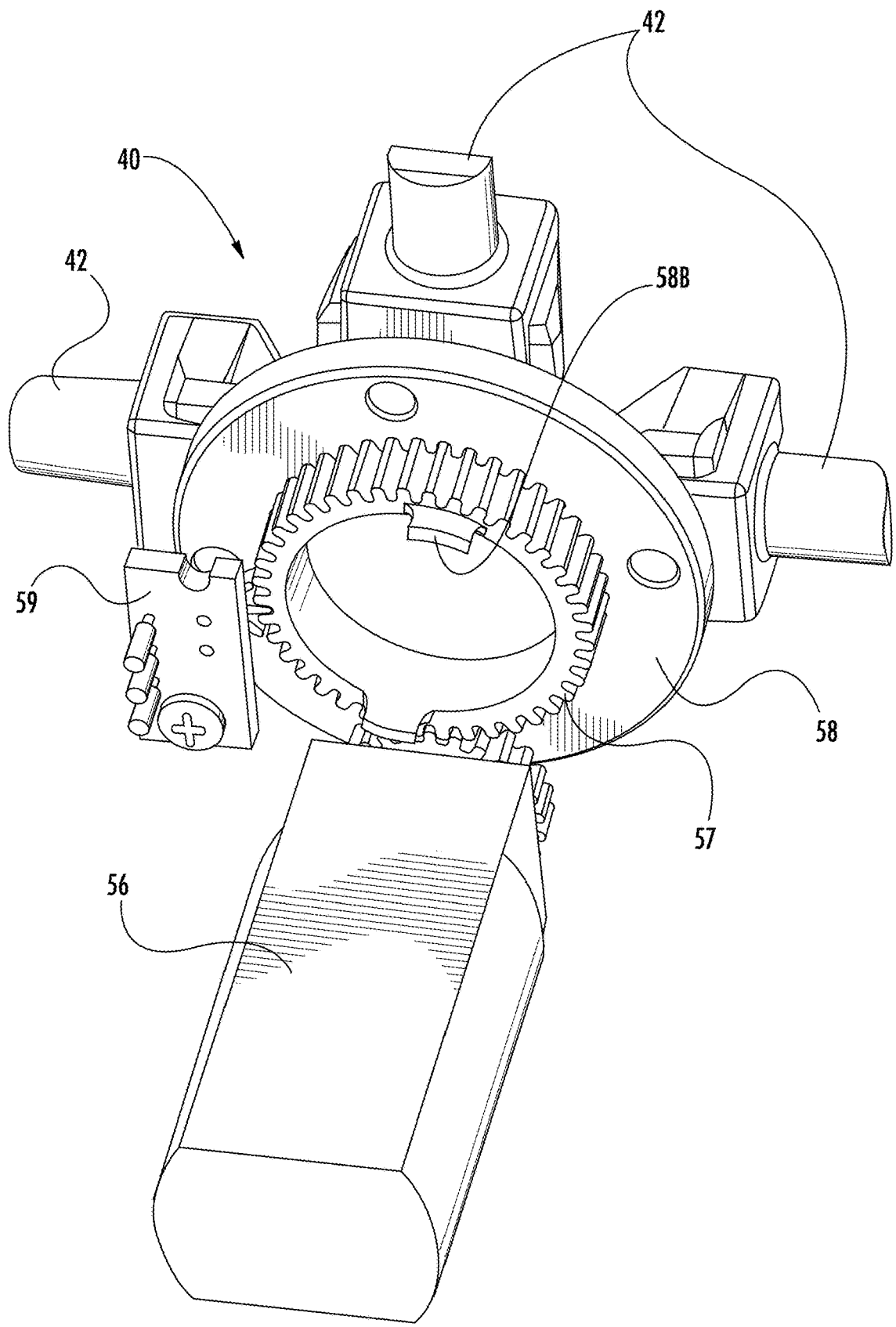
FIG. 9C is a schematic illustrating the electro-mechanical lock mechanism for the dock of the anti-theft device of FIG. 8.

FIGS. 9A-9C illustrate one embodiment of an electro-mechanical lock mechanism 40 suitable for use with an anti-theft device 10 according to the invention. In this regard, FIG. 9A shows a partial perspective view of a dock 50 wherein one finger 42 has been removed for purposes of illustration. In this particular embodiment, the dock 50 includes four fingers 42 equidistantly spaced apart from one another around the periphery of the dock. The fingers 42 may be spring-biased outwardly relative to the dock 50. The dock 50 includes a motor 56 operably engaged with a gear 57, which in turn is operably engaged with a cam 58. Actuating the motor 56 results in rotation of the gear 57, which also rotates the cam 58. The cam 58 includes camming surfaces 58A that are configured to engage a respective finger 42 to allow the finger to retract relative to the dock 50. For example, the cam 58 may include one or more camming surfaces 58A for engaging a respective finger 42 as the cam is rotated. Thus, rotation of the cam 58 facilitates retraction of each of the fingers 42 relative to the dock 50. Moreover, the electro-mechanical lock mechanism 40 may include a switch 59 configured to activate and deactivate the motor 56. FIG. 9C illustrates an example of such an electro-mechanical lock mechanism 40. For example, the cam 58 may include a plurality of engagement members 58B that are configured to engage a switch 59 when the cam is rotated. Thus, rotation of the cam 58 causes one of the engagement members 58B to engage the switch 59 to turn off the motor 56. Thus, the timing of the activation of the motor 56 may be tied to rotation of the cam 58, and a partial rotation of the cam (less than about 360 degrees) may retract each of the fingers 42. Moreover, the motor 56 may be operably engaged with the electronics of the dock 50 such that communication between the dock and an electronic key 25A facilitates activation of the motor. Similar to the embodiment discussed above, the fingers 42 may be configured such that placement of the shroud 20 on the dock 50 allows the handle 26 to slide over and engage the fingers 42 so as to overcome the biasing force of the springs 45 and urge the fingers inwardly until the shroud is seated on the dock. Once the shroud 20 is seated on the dock 50, the fingers 42 may be allowed to bias outwardly again when the fingers are aligned with the groove or slot 26A defined in the handle 26 of the shroud.

Another embodiment of a lock mechanism 40 is an electromagnetic lock. In this embodiment, the presence of the portable electronic device 15 may be detected upon docking with the dock 50, and an electromagnet (not shown) would engage, thereby holding the portable electronic device 15 to the dock 50 by a magnetic force.

Figure 16:
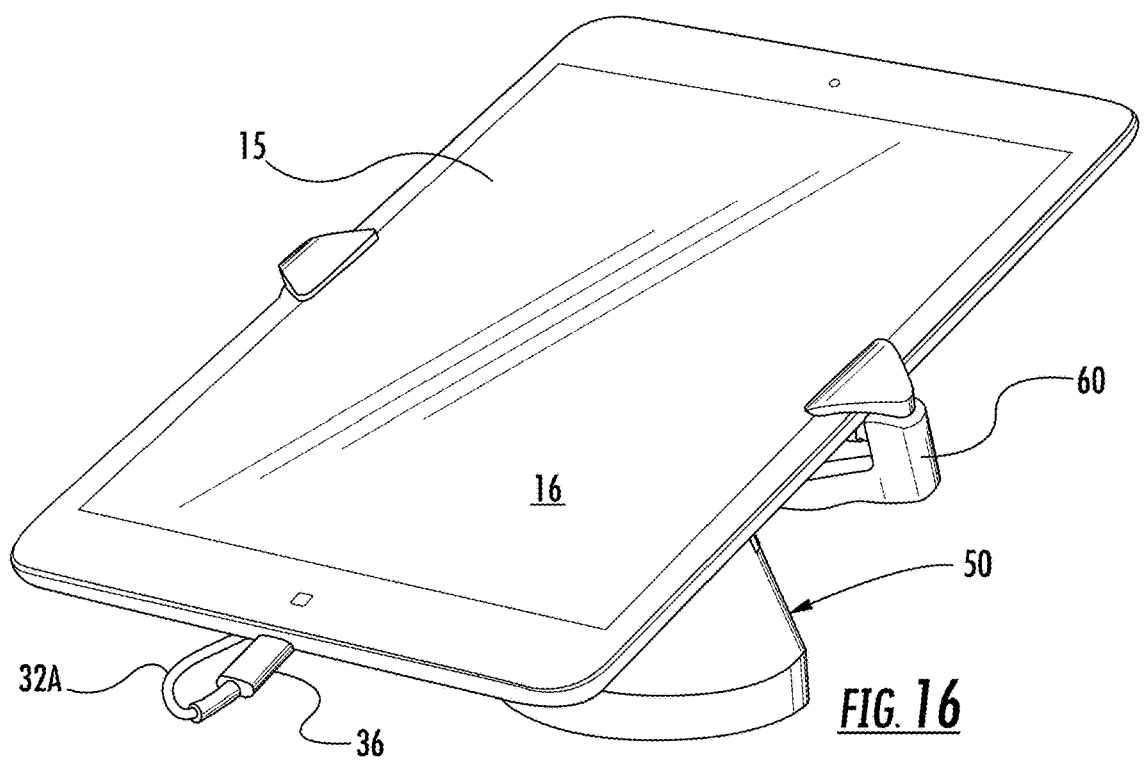
FIG. 16 is a perspective view of another anti-theft device for protecting a portable electronic device according to the invention.
Figure 17:
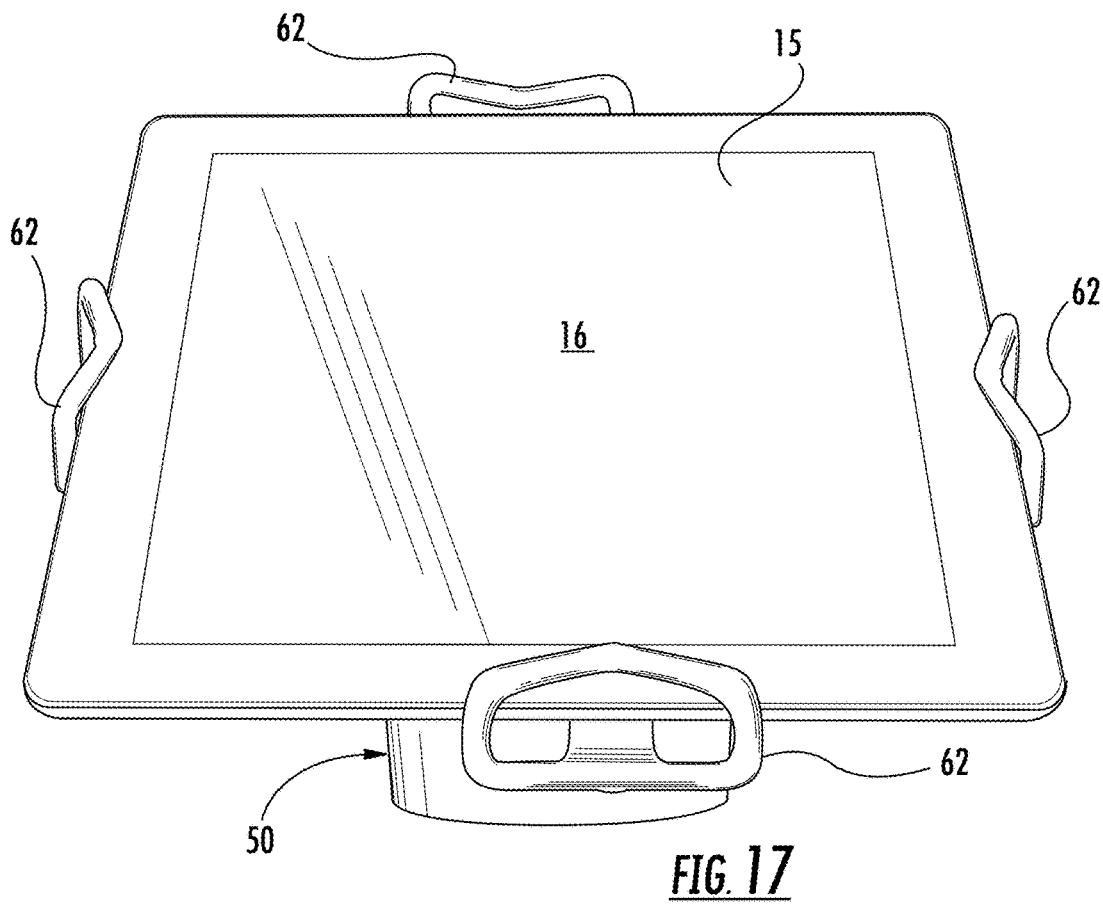
FIG. 17 is a front view of another anti-theft device for protecting a portable electronic device according to the invention.
Figure 18:
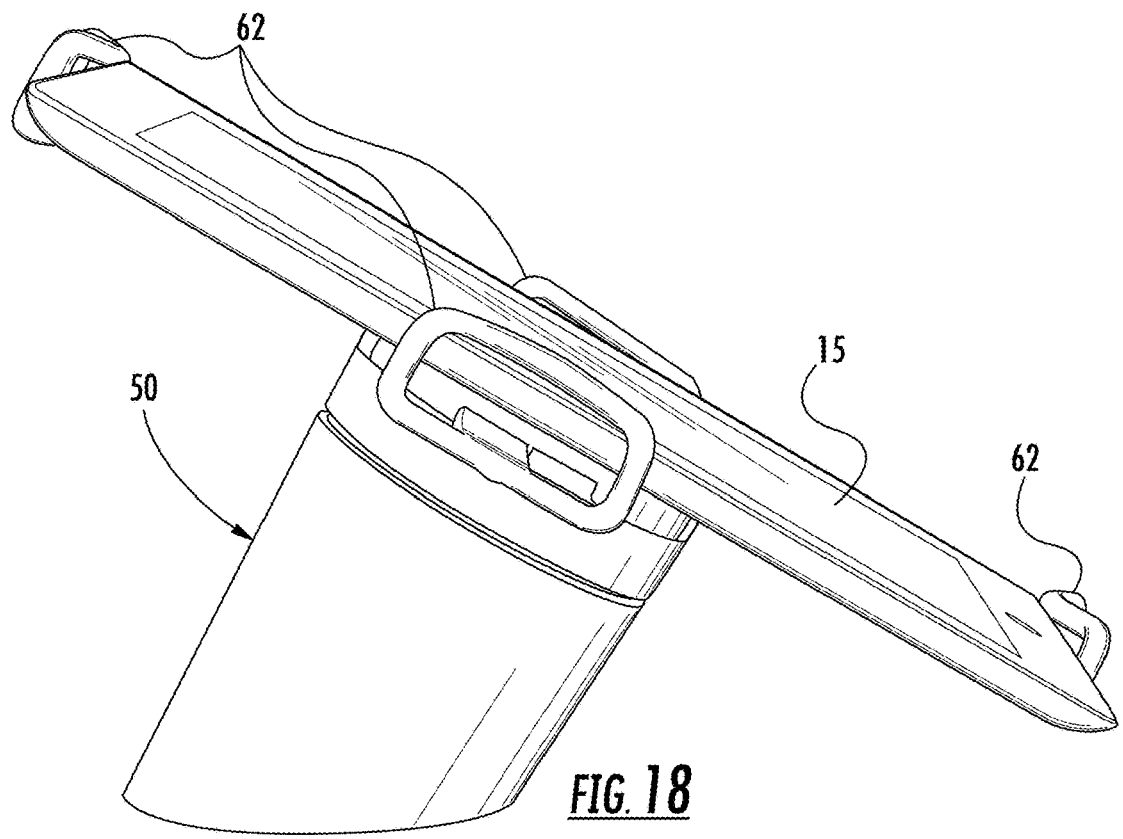
FIG. 18 is a side view showing the anti-theft device and the portable electronic device of FIG. 17.
Figure 19:
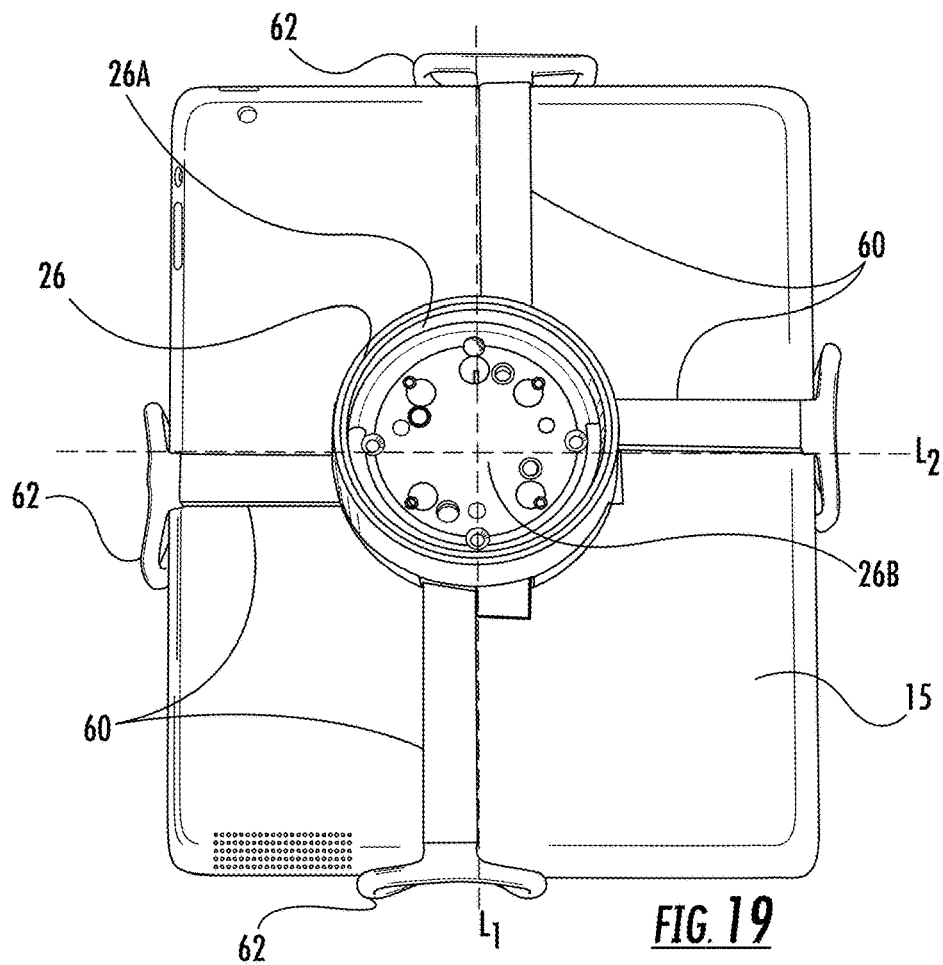
FIG. 19 is a rear view showing a portion of the anti-theft device and the portable electronic device of FIG. 17.
Figure 20:
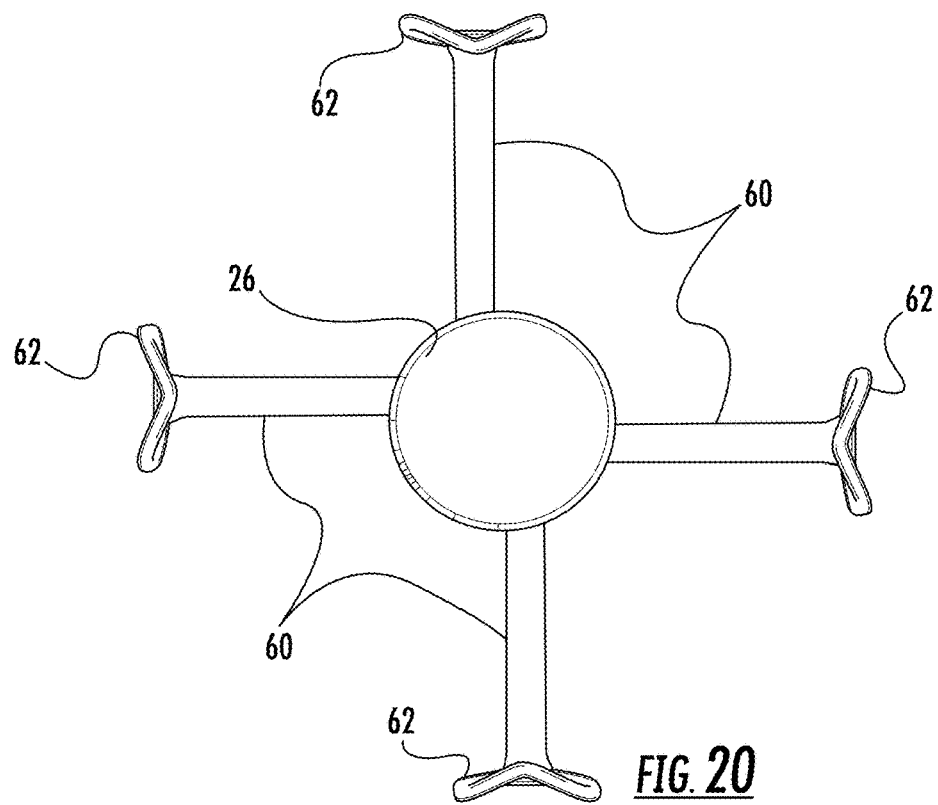
FIG. 20 is a top view showing the portion of the anti-theft device of FIG. 19.

In another embodiment of a lock mechanism 40 shown in FIG. 16, the anti-theft device 10 may include at least one arm 60 operably engaged with the dock 50 and configured to releasably engage the shroud 20 and/or portable electronic device 15. In one embodiment, the dock 50 may include a plurality of arms 60 that are configured to extend and retract relative to the dock 50 and/or the portable electronic device 15 to move between engaged and disengaged positions. For example, one or more arms 60 may be operably engaged with the handle 26 and be configured to engage the shroud 20 and/or portable electronic device 15. FIGS. 17-20 show one embodiment where a plurality of arms 60 is operably engaged with the handle 26. In this example, four arms 60 are shown and are configured to be adjusted relative to the handle 26 to accommodate different sized portable electronic devices 15. The arms 60 may be offset from one another across one or more axes so that the arms may allow for lateral adjustment relative to one another when engaging a portable electronic device 15 having smaller dimensions. FIG. 19 shows an exemplary embodiment wherein two pairs of opposing arms 60 extend parallel to one another and offset relative to one another along both a lateral axis L2 and a longitudinal axis L1. The handle 26 may include slots for receiving each arm such that each arm may slide to a desired position relative to the portable electronic device. In addition, each of the arms 60 may have an engagement member 62 at its end for engaging a surface of the portable electronic device 15, for example, an edge and a front surface of a tablet, as best seen in FIG. 17 and FIG. 18. It is to be understood that the arms 60 and engagement members 62 may be configured to engage the portable electronic device 15 regardless of whether a shroud is also provided. Thus, the arms 60 and engagement members 62 may be used in either instance, with or without a shroud 20.

FIG. 19 shows that when the portable electronic device 15 is unlocked from the lock mechanism 40, the portable electronic device 15 may be removed from the dock 50 while the arms 60 remain in engagement with the portable electronic device. Thus, the arms 60 do not interfere with locking or unlocking the portable electronic device 15 to or from the dock 50. In addition, when unlocked from the dock 50, a user is able to carry the portable electronic device 15 while the arms 60 remain engaged therewith. Furthermore, the arm(s) 60 may be secured to the handle 26 using any desired technique, such as directly or with an adapter plate coupled to the handle that is configured to receive and engage the arm(s) with the adapter plate. The arm(s) 60 may be mechanically secured to the handle 26 or an adapter plate using any suitable mechanism, such as with one or more fasteners. Alternatively, or in addition, the arms(s) 60 may be locked and unlocked from the handle 26 using a key, such as an electronic key 25A or a mechanical key 25B.

In some embodiments, the arms 60 may be configured to extend and retract in a similar manner as that described above with respect to the lock mechanisms 40 configured to activate the fingers 42. Thus, activation of the mechanical key 25B with the lock 55B of the dock 50 may disengage the arms 60 to allow an authorized user to remove the shroud 20 and portable electronic device 15 from the dock. For example, activation of a mechanical lock 55B with a mechanical key 25B may result in extension of at least one of the arms 60 so that the shroud 20 and portable electronic device 15 may be removed. Alternatively, activation of the mechanical lock 55B may simply unlock at least one of the arms 60 so that the arms may be manually moved out of engagement with the shroud 20 and portable electronic device 15. It is understood that any plurality of arms 60 could be employed, such as two, three, four, or more arms.

An unlocking feature for removing the portable electronic device 15 or disarming the alarming device may take many forms, including those discussed above. One embodiment is an electronic key 25A utilizing radio frequencies, infrared, or some other electronic means to communicate with the monitoring electronics 54 of the dock 50 and/or the alarming device to allow the portable electronic device 15 to be released. For example, the dock 50 may include a port 55A for receiving a signal from the electronic key 55B having a unique identifying code recognizable by the dock, but otherwise unrecognizable by other docks not associated with the code (e.g., in other departments or stores).

In one embodiment, the sensor 24 and/or shroud 20 may be coupled to the portable electronic device 15 via one or more connectors and input ports on the device (e.g., power input, head phone jack, and/or accessory ports). For example, the sensor 24 and/or shroud 20 may include a connector that releasably engages the head phone jack of the portable electronic device. Should the connector be removed from the head phone jack of the portable electronic device, a notification signal may be generated unless the user provides proper authorization (e.g., entering a password or presenting a key 25A). In one embodiment, the connector includes a lock (e.g., mechanical and/or electrical engagement) 23 that engages the head phone jack and that may only be disengaged from the connector using a key 25A or other suitable means (e.g., a password). The head phone jack could be male or female depending on the type of connector utilized to operably engage the portable electronic device with the sensor and/or shroud.

In another embodiment, the anti-theft device includes functionality for detecting changes in light level. For example, the anti-theft device 10 may be configured to detect a change in light level while the portable electronic device 15 is moving. Such movement and change in light level (e.g., from light to dark) may indicate that the portable electronic device 15 has been concealed in an unauthorized manner (e.g., by placing the device in a bag or under an item of clothing). Various techniques could be utilized for this purpose (e.g., light-detecting sensors, photodiodes, etc.) for detecting a change in light level. To reduce the incidence of false alarms, the anti-theft device 10 may also detect movement of the portable electronic device 15, as well as the movement for a predetermined period of time, which would distinguish instances that are not indicative of theft, such as where the portable electronic device 15 is dropped or the power is turned off. Where a security event is detected, such as where a decrease in light level is detected for a predetermined period of time while the portable electronic device 15 is moving, the sensor 24 and/or portable electronic device may be configured to communicate a security signal to a remote monitoring location. For example, the sensor 24 and/or portable electronic device 15 could send a wireless security signal to a monitoring station for triggering an alarm.

A key, fob, another mobile device, or the like 25A may be configured to be paired with a portable electronic device. Thus, the term "key" is not intended to be limiting. In some embodiments, the pairing may occur when the portable electronic device 15 is removed from a dock 50, although a dock is not necessary to do so. The pairing may occur between the key 25A and the portable electronic device 15, or between the key 25A and the sensor 24. For example, the pairing may be accomplished using radiofrequency, acoustic waves, magnetic waves, infrared, or a variety of other wireless or electronic couplings. Once this coupling has occurred, either the key 25A or the portable electronic device 15 may monitor a specified or predetermined distance therebetween. The key 25A may be held by a user in a pocket or on a lanyard or in any such manner as to maintain the key with the person. If a predetermined distance from an authorized location or area is exceeded, a notification signal (e.g., an audible alarm) may be generated, either from the key 25A or the portable electronic device 15. In this manner, the anti-theft device 10 is configured to warn a user who has left the portable electronic device 15 behind. It may also serve as a warning to any unauthorized user who attempts to steal the portable electronic device 15 and leaves the proximity of the authorized user. In addition to a notification signal, the portable electronic device 15 may be rendered inoperable should the device not be returned within the allowed distance within a predetermined period of time. Alternatively or in addition, the notification signal may become progressively more pronounced should the portable electronic device 15 not be returned within the allowed distance from the key 25A or as the portable electronic device travels further from the key. Due to the pairing of the key 25A and the portable electronic device 15, users of specific devices may be monitored and/or recorded.

The proximity of the portable electronic device 15 in relation to the key 25A may be determined using a variety of techniques. For example, the key 25A may be configured to monitor the strength of the wireless signal of the portable electronic device 15. Where the wireless signal becomes too weak due to the portable electronic device 15 being located beyond a predetermined distance or perimeter from the key 25A, a notification signal may be generated. Of course, the key 25A may be configured to generate a wireless signal, and the portable electronic device 15 or a sensor 24 associated with the portable electronic device may be configured to detect the wireless signal and perform a similar function. In other embodiments, the portable electronic device 15 may include functionality (e.g., a GPS receiver, gyroscopes, and/or accelerometers) for determining its location and communicating with the key 25A to determine the distance therebetween. Likewise, the key 25A may include such locating functionality. Should the distance between the portable electronic device 15 and the key 25A be greater than a predetermined distance, a notification signal may be generated.

It is understood that a notification signal could also be generated when the portable electronic device 15 is within a predetermined distance from the key 25A or some other device (e.g., a security gate). Thus, a notification signal could be generated should the key 25A (or some other device) and the portable electronic device 15 be too close to one another. The key 25A and/or portable electronic device 15 could be coded to include the functionality of generating a notification signal should the key and the portable electronic device be too close or too far away from one another.

In one embodiment, the key 25A may include a "snooze" function whereby the key may be configured to delay the generation of a notification signal for a predetermined period of time. For example, should the user of the portable electronic device 15 attend to another task and temporarily leave the device behind, the key 25A or portable electronic device may interpret the inactivity as being indicative of a security event. Thus, the user may use the key 25A to delay the generation of a notification signal, but following the predetermined period of time allowed for snoozing, a notification signal may be generated and/or the user may be asked to provide authentication to the portable electronic device 15 before use may again be commenced. The predetermined period of snooze time may be preset into the key 25A or the portable electronic device 15, or the snooze time may be input by an authorized user.

In one embodiment, the key 25A and the portable electronic device 15 may be paired or otherwise linked so as to provide bi-directional communication therebetween. Thus, the key 25A and the portable electronic device 15 may be wirelessly linked to one another such that separation beyond a predetermined distance results in a notification signal. Alternatively, the key 25A may unilaterally determine whether the portable electronic device 15 is within a predetermined distance. For example, the key 25A may generate a digital "ping" or similar signal that is received by the portable electronic device 15. Should the portable electronic device 15 receive the signal from the key 25A, the portable electronic device may send a corresponding signal back to the key indicating that the signal was received by the portable electronic device. Should the key 25A not receive a corresponding signal from the portable electronic device 15, a notification signal may be generated. Likewise, the portable electronic device 15 may be configured to send a signal to the key 25A, and the key configured to listen for the signal. Should the portable electronic device 15 not receive a corresponding signal back from the key 25A, a notification signal may be generated.

It is understood that the communication between the key 25A and the portable electronic device 15 may alternatively be one-directional. For instance, the key 25A may be configured to send a signal or digital "ping." and if the portable electronic device 15 does not receive the signal or digital "ping," a notification signal is generated by the portable electronic device. Likewise, the portable electronic device 15 may be configured to generate a signal or digital "ping." and if the key 25A does not detect the signal or digital "ping." a notification signal is generated by the key. Thus, a return signal from the key 25A or portable electronic device 15 is unnecessary in this embodiment. Either the key 25A or the portable electronic device 15 may send such a signal or digital "ping" continuously or in desired time increments.

In further embodiments, the anti-theft device 10 may employ a "timeout" feature should the key 25A and portable electronic device 15 be separated beyond an allowable distance therebetween. For example, the portable electronic device 15 and/or key 25A may be rendered inoperable if the portable electronic device is not returned within a predetermined distance from the key in a predetermined amount of time. The portable electronic device 15 may be configured to prompt the user to input a password or present a security code or key in order to authenticate that the user is an authorized user. In other cases, the portable electronic device 15 may be configured to timeout if the device remains motionless for more than a predetermined period of time.

The portable electronic device 15 may then request the user to provide authentication (e.g., a password) before the portable electronic device may be again operated. A similar timeout feature could be used where the user of the portable electronic device 15 has changed. Thus, should another user take control of the portable electronic device 15, the user may be prompted to provide suitable authentication. The key 25A could also timeout after a predetermined period of time such that the key requires further validation before use with a portable electronic device 15. For instance, the key 25A may timeout after a set time period (e.g., 6-10 hours) to limit the incidence of theft or reuse of the key by an unauthorized user. In order to prevent inadvertent timing out, the key 25A and/or portable electronic device 15 may be configured to generate a warning signal (e.g., audible, visible, and/or haptic) that a timeout is going to occur in a predetermined period of time. In this instance, the user can override the timeout if the user presents the key 25A, continues use of the portable electronic device 15, or otherwise provides sufficient validation.

In some embodiments, the portable electronic device 15 can be armed, disarmed, and/or silenced with the key 25A, which may utilize mechanical, wireless, and/or electrical communication between the portable electronic device and the security key. For example, the key 25A may be configured to wirelessly communicate a security code to the portable electronic device 15, such as by infrared, optical, acoustic, or inductive communication. An alarming device may include a port, window, or the like configured to receive wireless signals from the key 25. In one particular embodiment, the key 25A is similar to that disclosed in U.S. Pat. No. 7,737,845, entitled Programmable Key for a Security System for Protecting Merchandise, the entire disclosure of which is incorporated herein by reference. In additional embodiments, the portable electronic device 15 may include near field communication (NFC) functionality and be configured to communicate with the key 25A or an alarming device having NFC functionality for arming and disarming the portable electronic device. Alternatively, the alarming device may include "screen swipe" functionality and be configured to sense particular movement or motion of the portable electronic device 15 and/or the key 25A to arm or disarm the portable electronic device. Likewise, the portable electronic device 15 and/or key 25A may include biometric functionality for recognizing a particular user to arm or disarm the portable electronic device.

In another embodiment, the anti-theft device 10 may utilize motion of the portable electronic device 15 and/or key 25A to determine whether the portable electronic device is within an authorized perimeter or area. In this way, the authorized perimeter may be defined about a particular location where the portable electronic device 15 or key 25A has stopped moving. For example, the authorized area may be defined to be within an estimated reaching distance of the user (e.g., about 2-3 feet). Thus, should a user leave the portable electronic device 15 and move beyond a predetermined distance, a security signal may be generated by the portable electronic device and/or key 25A, or the portable electronic device could be timed-out such that a password, security code or key is required to resume use of the portable electronic device.

Various techniques may be used to determine the location of the portable electronic device 15, the shroud 20, the key 25A, and/or the sensor 24. In one embodiment, the location of the portable electronic device 15 is determined with existing functionality of the device (e.g., a GPS receiver, gyroscopes, and/or accelerometers), although such functionality could alternatively be integrated with a sensor 24, a key 25A, and/or a shroud 20. In some embodiments, the anti-theft device 10 incorporates techniques for determining a location of the portable electronic device 15 similar to those disclosed in U.S. Publication No. 2012/0293330, entitled Systems and Methods for Protecting Retail Display Merchandise From Theft, filed May 18, 2012, the entire disclosure of which is incorporated herein by reference.

Various techniques in addition to those previously described with reference to the drawing figures may also be used to protect the portable electronic device 15 from theft or unauthorized removal. For example, the portable electronic device 15 may include functionality or cooperate with one or more other devices to provide security in a variety of locations, whether fixed or defined by a user. The authorized use of the portable electronic device 15 may be limited based on a location of the portable electronic device relative to the anti-theft device 10, another device, a location, or a predefined perimeter. Thus, safeguards may be provided to a user of a portable electronic device 15 where the user is required to use the device in a variety of locations and settings. Should a security event be detected (e.g., removal of the portable electronic device 15 from an authorized perimeter), a notification or security signal (e.g., an audio, a visual, and/or haptic alarm) may be generated by the anti-theft device 10, the portable electronic device 15, or from any other device or location.

In one embodiment, the anti-theft device 10 utilizes the position of the portable electronic device 15 to determine whether the portable electronic device has moved to an unauthorized location. In this regard, a predefined distance from an authorized location may be defined, or a predefined perimeter may be defined about an authorized location. While the portable electronic device 15 is within the predefined distance or inside the predefined perimeter, no security signal is generated. However, should the portable electronic device 15 be moved beyond the predefined distance or perimeter, a notification or security signal may be generated. The notification signal may also be generated if the portable electronic device 15 is moved beyond the authorized distance or perimeter for a predetermined period of time. Thus, should the portable electronic device 15 be temporarily moved beyond the authorized distance or perimeter, a notification signal may not be generated should the portable electronic device 15 be returned within a predetermined period of time. Various notification signals could be generated. For example, a first warning signal could be generated when the portable electronic device 15 is moved beyond the predefined distance or perimeter. Further, more significant security signals (e.g., greater intensity, duration, etc.), may be generated should the portable electronic device 15 not be returned to a location within the authorized distance or perimeter.

Various techniques may be employed to define a particular authorized distance or perimeter. In one embodiment, the predefined distance or perimeter is determined by the owner of the anti-theft device 10, for example, a retailer. Thus, the predefined distance or perimeter could be communicated to the portable electronic device 15 (e.g., as a map). In another embodiment, the authorized distance or perimeter may be defined by the user of the portable electronic device 15, or by the portable electronic device itself, such as by establishing one or more thresholds. For example, the user may move the portable electronic device 15 to define a particular perimeter or "virtual map". The virtual map could define an authorized distance or perimeter within which the portable electronic device 15 may be safely moved without triggering a security signal. Alternatively, the user could draw a particular distance or perimeter using the portable electronic device 15 or another device and sync the desired perimeter to the portable electronic device. In another embodiment, the perimeter could be established using photographs of the environment and the photographs may then be stitched together to define the perimeter. In another embodiment, various nodes could be used to establish a predefined distance, perimeter or other thresholds. For example, the user could use the portable electronic device 15 or other device to select various nodes within a particular area (e.g., a retail store) to define the perimeter. The nodes could be any suitable means to establish a location, such as NFC tags, RFID tags, or the like. Thus, the perimeter could be any desired shape defined by a user, wherein the shape could be later modified as needed.

In another embodiment, the anti-theft device 10 is configured to generate a security signal based on a location of the portable electronic device 15, such as when the device has been moved beyond an authorized distance from the anti-theft device 10, or from another device, or from a predefined location, or outside an authorized perimeter. In this embodiment, the authorized location may be "mobile" or "dynamic" in that the authorized location may change with respect to the location of the portable electronic device 15. For example, an authorized perimeter could be defined based on a layout in a particular retail department, in a particular wing of a hospital, in a particular section of a restaurant, etc. In one embodiment, the authorized location may be defined by a pairing between a key 25A and the portable electronic device 15, wherein such pairing may be similar to that described above. Thus, the authorized location may be dynamically defined based on the location of the portable electronic device 15 and need not be limited to a particular fixed location.

In a further embodiment, the anti-theft device 10 includes anti-microbial material. For example, the anti-theft device 10 may be coated with or otherwise integrate anti-microbial material to reduce or eliminate bacteria or microorganisms. Such anti-microbial material could be beneficial in the medical or food service environments. In some embodiments, the material forming one or more components or portion of the anti-theft device 10 (e.g., alarming device, stand, dock 50, sensor 24, shroud 20, handle 26, and/or key 25A or 25B) may include anti-microbial material. The anti-microbial material may be coated on, attached to, or otherwise coupled to the anti-theft device 10, or the anti-microbial material could be integrated into the material forming the particular component of the anti-theft device. In other embodiments, the component of the anti-theft device 10 may include a material that is anti-microbial. In one example, the anti-microbial material is a polymer material including one or more anti-microbial agents.

The foregoing has described one or more embodiments of an anti-theft device 10 for protecting a portable electronic device 10, for example, a tablet, from theft or unauthorized removal. Those of ordinary skill in the art will understand and appreciate that numerous variations and modifications of the invention may be made without departing from the spirit and scope of the invention. Accordingly, all such variations and modifications are intended to be encompassed by the appended claims.

That which is claimed is:

1. An anti-theft system for protecting a portable electronic device from theft or unauthorized removal, the portable electronic device having a front surface, a rear surface, and a side edge extending therebetween, the anti-theft system comprising:
   an interface comprising a plurality of arms configured to engage the portable electronic device for securing the portable electronic device to the interface to prevent removal of the portable electronic device from the interface in a first position, at least one of the plurality of arms configured to be moved to a second position for allowing the portable electronic device to be removed from the interface, wherein each of the plurality of arms comprises an engagement member for engaging the side edge and the front surface of the portable electronic device;
   a dock configured to engage the interface for displaying the portable electronic device, wherein the dock is configured to removably support the portable electronic device such that the portable electronic device is removable from the dock; and
   a wireless device, external to the interface and the dock, configured to wirelessly communicate with the interface or the dock to cause the at least one of the plurality of arms to move to the second position to allow removal of the portable electronic device from the interface while the interface remains engaged with the dock.

2. The anti-theft system of claim 1, wherein the at least one of the plurality of arms is configured to be automatically moved from the second position to the first position in response to placement of the portable electronic device on the interface.

3. The anti-theft system of claim 2, further comprising a detection device configured to detect the presence of the portable electronic device for automatically moving the at least one of the plurality of arms from the second position to the first position.

4. The anti-theft system of claim 3, wherein the detection device is an optical switch.

5. The anti-theft system of claim 1, further comprising a motor for moving the at least one of the plurality of arms from the first position to the second position.

6. The anti-theft system of claim 5, wherein the motor is configured to be activated in response to communication with the wireless device.

7. The anti-theft system of claim 5, further comprising a device configured to cause the motor to automatically deactivate at least partially based on a position of the plurality of arms.

8. The anti-theft system of claim 7, wherein the device is a switch.

9. The anti-theft system of claim 1, further comprising a motor for moving each of the plurality of arms from the first position to the second position.

10. The anti-theft system of claim 1, wherein the wireless device is configured to communicate with the interface or the dock using Wi-Fi, Bluetooth, or cellular communication protocols.

11. The anti-theft system of claim 1, wherein the wireless device is a mobile device.

12. The anti-theft system of claim 1, wherein the wireless device is configured to communicate with the interface or the dock using radio frequency or infrared communications.

13. The anti-theft system of claim 1, wherein the dock is configured to transfer power to the portable electronic device while the portable electronic device is positioned on the interface.

14. The anti-theft system of claim 1, wherein the interface is configured to be releasably locked on the dock such that the interface cannot be removed from the dock, and wherein the interface is further configured to be unlocked from the dock such that the interface is removable from the dock.

15. The anti-theft system of claim 1, wherein at least one of the plurality of arms is adjustable relative to interface to accommodate different sized portable electronic devices.

16. The anti-theft system of claim 1, wherein the at least one of the plurality of arms is configured to extend outwardly to allow removal of the portable electronic device from the interface.

17. The anti-theft system of claim 1, wherein the at least one of the plurality of arms is spring biased towards an extended position.

18. The anti-theft system of claim 1, wherein the wireless device is configured to wirelessly communicate with the interface or the dock to cause the plurality of arms to move to the second position to allow removal of the portable electronic device from the interface.

19. The anti-theft system of claim 1, wherein the dock is configured to electrically communicate with the interface in a plurality of display orientations.

20. The anti-theft system of claim 1, wherein the interface and the portable electronic device are configured to rotate relative to the dock while the interface is engaged with the dock.

21. The anti-theft system of claim 1, wherein the wireless device is a programmable key.

22. The anti-theft system of claim 1, wherein the wireless device is a fob.

23. The anti-theft system of claim 1, wherein the interface is configured to communicate a notification signal to the wireless device in response to a security event.

24. The anti-theft system of claim 1, further comprising an alarm configured to generate a security signal in response to unauthorized removal of the portable electronic device from the dock.

25. The anti-theft system of claim 1, wherein the plurality of arms are configured to slide relative to one another along an axis between the first position and the second position.

26. An anti-theft system for protecting a portable electronic device from theft or unauthorized removal, the anti-theft system comprising:
an interface comprising a plurality of arms configured to engage the portable electronic device for securing the portable electronic device to the interface to prevent removal of the portable electronic device from the interface in a first position, at least one of the plurality of arms configured to be moved to a second position for allowing the portable electronic device to be removed from the interface, wherein each of the plurality of arms comprises an engagement member for engaging an edge and a front surface of the portable electronic device;
a dock configured to engage the interface for displaying the portable electronic device, wherein the dock is configured to removably support the portable electronic device such that the portable electronic device is removable from the dock;
a motor for moving the at least one of the plurality of arms from the first position to the second position; and
an electronic key or a fob configured to wirelessly communicate with the interface or the dock to activate the motor for moving the at least one of the plurality of arms to the second position to allow removal of the portable electronic device from the interface while the interface remains engaged with the dock.

27. The anti-theft system of claim 1, wherein the wireless device is independent of, and external to, the portable electronic device, the interface, and the dock.

28. The anti-theft system of claim 1, wherein the dock is configured to be fixed to a support surface with one or more fasteners and/or an adhesive.

29. The anti-theft system of claim 1, wherein each of the plurality of arms is configured to extend along the rear surface of the portable electronic device and a respective engagement member is located at an end of the arm.

30. The anti-theft system of claim 1, wherein the plurality of arms are positioned such that the respective engagement members of the plurality of arms engage opposite side edges of the portable electronic device.

31. The anti-theft system of claim 26, wherein the electronic key is a mobile device configured to wirelessly communicate with the interface or the dock to activate the motor for moving the at least one of the plurality of arms to the second position to allow removal of the portable electronic device from the interface while the interface remains engaged with the dock.

32. The anti-theft system of claim 26, wherein the at least one of the plurality of arms is configured to be automatically moved from the second position to the first position in response to placement of the portable electronic device on the interface.

33. The anti-theft system of claim 26, wherein the motor is configured to be automatically deactivated at least partially based on a position of the plurality of arms.

34. The anti-theft system of claim 26, wherein the electronic key or the fob is configured to wirelessly communicate with the interface or the dock to cause the plurality of arms to move to the second position to allow removal of the portable electronic device from the interface.

* * * * *